(12) United States Patent
Yamada et al.

(10) Patent No.: US 11,691,494 B2
(45) Date of Patent: Jul. 4, 2023

(54) ELECTRIC MOTOR VEHICLE BATTERY SUPPORT ASSEMBLY

(71) Applicant: MAZDA MOTOR CORPORATION, Hiroshima (JP)

(72) Inventors: Morihide Yamada, Aki-gun (JP);
Kazuhisa Hatano, Aki-gun (JP);
Hisashi Akune, Aki-gun (JP);
Munenari Takahashi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 188 days.

(21) Appl. No.: 17/325,908

(22) Filed: May 20, 2021

(65) Prior Publication Data

US 2021/0402862 A1 Dec. 30, 2021

(30) Foreign Application Priority Data

Jun. 29, 2020 (JP) .............................. JP2020-111415

(51) Int. Cl.
*B60K 1/04* (2019.01)
*B62D 25/20* (2006.01)
*H01M 50/209* (2021.01)
*H01M 50/249* (2021.01)

(52) U.S. Cl.
CPC ................ *B60K 1/04* (2013.01); *B62D 25/20* (2013.01); *H01M 50/209* (2021.01); *H01M 50/249* (2021.01); *B60K 2001/0438* (2013.01); *H01M 2220/20* (2013.01)

(58) Field of Classification Search
CPC .. B60K 1/04; B60K 2001/0438; B62D 25/20; H01M 2220/20; H01M 50/209; H01M 50/249
See application file for complete search history.

(56) References Cited

U.S. PATENT DOCUMENTS

| | | | |
|---|---|---|---|
| 6,431,300 B1* | 8/2002 | Iwase ....................... | B60K 1/04 |
| | | | 180/68.5 |
| 9,132,864 B2* | 9/2015 | Andre ...................... | B60K 1/04 |
| 11,431,049 B2* | 8/2022 | Kang .................. | H01M 50/233 |
| 2009/0152034 A1* | 6/2009 | Takasaki ................ | B60L 50/52 |
| | | | 180/68.5 |
| 2013/0153317 A1* | 6/2013 | Rawlinson ............. | F41H 7/042 |
| | | | 180/68.5 |
| 2020/0114973 A1* | 4/2020 | Takahashi .......... | B62D 25/2036 |

(Continued)

FOREIGN PATENT DOCUMENTS

| | | |
|---|---|---|
| JP | 2009-143446 A | 7/2009 |
| JP | 2011-251620 A | 12/2011 |
| JP | 2012-096789 A | 5/2012 |

*Primary Examiner* — John D Walters
*Assistant Examiner* — James J Triggs
(74) *Attorney, Agent, or Firm* — Studebaker & Brackett PC

(57) ABSTRACT

A battery unit which stores plural battery modules therein is attached to respective lower faces of a pair of floor frames at its both sides. The battery unit comprises an attaching bracket which protrudes substantially horizontally from the battery case and is positioned just below the lower face of the floor frame with a distance therebetween. A specified rigidity ratio is set for an attachment portion of the battery unit to the floor frame, and the attaching bracket is attached to the lower face of the floor frame via an intermediate part such that the above-described rigidity ratio is 0.1 or greater.

19 Claims, 17 Drawing Sheets

(56) References Cited

U.S. PATENT DOCUMENTS

| | | | |
|---|---|---|---|
| 2020/0361535 A1* | 11/2020 | Matsuda | B62D 21/04 |
| 2020/0376948 A1* | 12/2020 | Yamada | B60L 50/66 |
| 2020/0381686 A1* | 12/2020 | Yamada | B60L 50/64 |
| 2020/0406976 A1* | 12/2020 | Shioya | B62D 21/09 |
| 2021/0188069 A1* | 6/2021 | Friedman | H01M 50/20 |
| 2021/0370782 A1* | 12/2021 | Choi | B60L 53/12 |
| 2022/0324312 A1* | 10/2022 | Marginet | B60K 1/04 |

* cited by examiner

ELECTRIC MOTOR VEHICLE BATTERY SUPPORT ASSEMBLY

BACKGROUND OF THE INVENTION

The present invention relates to an electric motor vehicle driven by electric power.

The electric motor vehicles driven by the electric power, such as a hybrid vehicle driven by combination of an internal combustion engine and an electric motor or an electric automobile driven by the electric motor only, have been recently paid attention to. In these electric motor vehicles, a secondary battery (driving battery) to drive the electric motor is installed. The driving battery cannot be charged all the time, so that the driving battery which has been charged needs to drive the heavy vehicle. Therefore, the driving battery is required to have large capacity.

In order to provide such large-capacity battery, the driving battery is generally constituted by plural battery modules, each of which is made by a battery-cell assembly and which are interconnected together. Further, the driving battery is integrated (battery unit) by storing the interconnected battery modules in a battery case having a specified shape. Accordingly, the driving battery becomes large-sized and heavy (e.g., hundreds of kilograms). Therefore, the driving battery is generally configured such that its length and its width are relatively large but its thickness is relatively small, so that it is arranged below a vehicle body properly.

In an electric automobile disclosed in Japanese Patent Laid-Open Publication No. 2009-143446 (US2009/0152034 A1), for example, a lower frame of a vehicle body 11 is constituted by a pair of right-and-left side members 31, 32 which extend in a longitudinal direction at both sides of a vehicle, plural cross members 33, 34, 35 which laterally interconnect the both side members 31, 32 at intervals in the longitudinally, and a floor panel 70 which is joined to respective upper faces of the side members 31, 32 and the cross members 33, 34, 35.

A battery unit 14 which corresponds to the driving battery is arranged between the side members 31, 32 and below the cross members 33, 34, 35 and the floor panel 70. This battery unit 14 comprises a battery case 50 which stores plural battery modules therein and hollow prism-shaped girder members 101, 102, 103, 104 which are attached to a lower side of the battery case 50. These girder members 101-104 are arranged at the lower side of the battery case 50 such that they extend in the lateral direction at intervals in the longitudinal direction. Both ends of these members 101-104 protrude from right-and-left both sides of the battery case 50.

Insertion holes are formed at the both sides of the girder members 101-104, thereby constituting fastening portions 121, 122, 123, 124, 125, 126. Further, a pair of front-side supporting members 130, 131 to constitute fastening portions 210, 211 are provided at a front end portion of the battery unit 14.

Battery-unit attachment portions are provided at portions of the side members 31, 32 which respectively correspond to these fastening portions 121-126. Rigidity of each of these battery-unit attachment portions is reinforced by the reinforcing members 301, 302. The fastening portions 121-126 are directly fixed to respective lower sides of the battery-unit attachment portions by bolt fastening. The fastening portions 210, 211 are fixed to the cross member 33 by bolt fastening. The battery unit 14 is attached to a lower frame of the vehicle body 11.

Japanese Patent Laid-Open Publication No. 2011-251620 discloses an electric motor vehicle in which frames of a battery unit are fixedly fastened to right-and-left floor frames directly, similarly to the electric automobile disclosed in the above-described patent document.

Further, Japanese Patent Laid-Open Publication No. 2012-096789 discloses a technology capable of adjusting the level of each of the fastening portions 121-126 of the electric automobile disclosed in the above-described patent document. Specifically, each of the fastening portions 121-126 is made of a base metal fitting 220 which comprises a pair of fittings 220, 221 having a nearly U-shaped cross section. Respective positions of the fittings 220, 221 are offset so as to form a closed-cross section structure and these fittings 220, 221 are welded, whereby the fastening portions 121-126 are respectively constituted. Thereby, even if there occurs a difference in the level among the battery-unit attachment portions, each fastening can be attained by a nearly equal force.

Primary conditions, such as each size, structure, arrangement of the vehicle body and the battery unit, are mostly decided in a designing stage because the function, performance and others to be desired for the vehicle body and the battery unit are to be satisfied in the designing.

For example, the level (height position) of a lower face of the battery unit is determined by the lowest aboveground height of the vehicle. The level of an upper face of the battery unit is determined by the size, the capacity and the like of the battery module. With respect to the vehicle body as well, for example, the size, shape and others of a cross section of a hollow cylindrical-shaped floor frame (corresponding to the side members 31, 32) are determined by the collision safety, the traveling stability, the comfortability (NVH), and the like. The size, shape and others of a cross section of a battery frame (correspond to the girder members 101-104) are determined by the rigidity to be desired for the battery unit as well.

Accordingly, each of the floor frame and the battery unit is not necessarily positioned at a level which is appropriate to their connection. That is, there is a case where respective connection portions of the floor frame and the battery unit are vertically apart from each other, so that there occurs a gap therebetween. In this case, since the floor frame and the battery unit cannot be fastened directly like the structures disclosed in the above-described first and second patent documents, it may be difficult to fix them firmly.

Therefore, it can be considered that the size of the cross section of the floor frame or the battery unit is changed like the structure disclosed the third patent document, thereby adjusting the level. In this case, however, it is necessary to increase the size of a structural member of the frame excessively. Consequently, the weight increase of the frame is caused, so that the power consumption may improperly increase.

It can be also considered that a bracket to attach the battery unit to the floor frame (corresponding to the respective fastening portions) is bent vertically, thereby adjusting the level. In this case, however, the rigidity, in a vehicle width direction, of the bracket improperly decreases. If the thickness of the bracket is increased for securing the appropriate rigidity, the weight increase of the vehicle is caused, so that the power consumption may increase as well.

Moreover, the above-described attachment manners need to consider vibration noises. That is, there is a case where the floor frame and the battery unit resonate in the vehicle width direction during vehicle traveling, so that the noises uncomfortable to passengers may be generated. Particularly, there possibly occurs a problem of the vibration noises (road noises) of an intermediate frequency band of about 125 Hz.

SUMMARY OF THE INVENTION

Accordingly, an object of the present invention is to provide an electric motor vehicle which can properly connect the floor frame and the battery unit, suppressing the weight increase of the vehicle, even in a case where the respective connection portions of the floor frame and the battery unit are vertically apart from each other.

The present invention is an electric motor vehicle which comprises a floor panel constituting a lower face of the vehicle, a pair of floor frames provided to be spaced apart from each other at both sides of the vehicle and extending in a longitudinal direction, the floor frames being attached to the lower face of the floor panel so as to respectively form a hollow prism-shaped closed-cross section structure together with the floor panel, and a battery unit attached to respective lower faces of the floor frames at both sides thereof and arranged below the floor panel, wherein the battery unit comprises plural battery modules, a battery case storing the battery modules therein, and an attaching bracket protruding substantially horizontally from the battery case and positioned just below the lower face of the floor frame with a distance therebetween, a rigidity ratio (Rb/Rf) which is a ratio of rigidity (Rb), in a vehicle width direction, of a section of an attachment portion of the battery unit to the floor frame which is positioned below the lower face of the floor frame to rigidity (Rf) of another section of the attachment portion of the battery unit to the floor frame which is positioned above the lower face of the floor frame is set based on a predetermined specific value relating to rigidity, and the attaching bracket is attached to the lower face of the floor frame via an intermediate part such that the rigidity ratio (Rb/Rf) is 0.1 or greater.

That is, in the electric motor vehicle according to the present invention, the battery unit is attached to the respective lower faces of the pair of floor frames which are attached to the floor panel so as to respectively form the hollow prism-shaped closed-cross section structure. Further, at this attachment portion of the battery unit to the floor frame, the attaching bracket protruding substantially horizontally from the battery case is positioned just below the lower face of the floor frame with the distance therebetween.

Herein, as described above, since there exists the gap between the respective connection portions of the floor frame and the battery unit because of various restrictions (conditions), it may be difficult to attach the attaching bracket to the lower face of the floor frame directly, suppressing the weight increase of the vehicle, in order to secure the high rigidity. Moreover, it becomes necessary to consider the vibration noises in this kind of attachment.

Accordingly, in the electric motor vehicle according to the present invention, the attaching bracket is attached to the lower face of the floor frame via the specified intermediate part such that the rigidity ratio is 0.1 or greater based on the specified correlation of the specified rigidity ratio of these connection portions and the vibration noises.

This correlation has been found by the inventors of the present invention for the purpose of solving the above-described problem. In this correlation, it is recognized that there is an inflection point around the rigidity ratio of 0.1 and, in a region where the rigidity ratio is smaller than 0.1, the smaller the rigidity ratio is, the more quickly the vibration noises increase. Accordingly, the vibration noises can be effectively suppressed by making the rigidity ratio be 0.1 or greater.

Further, the smaller rigidity ratio can decrease the rigidity of the battery-unit side. That is, the weight of the attaching bracket can be made small. Accordingly, the weight reduction can be attained by making the value of the rigidity ratio small as well. Thus, according to the electric motor vehicle of the present invention, even in the case where there exists the vertical gap between the respective connection portions of the floor frame and the battery unit, the floor frame and the battery unit can be connected properly, suppressing the vibration noises and the weight increase of the vehicle.

Further, the present electric motor vehicle may be configured such that the above-described rigidity ratio is set to be 0.1 or greater and 0.5 or smaller.

According to the knowledge of the present inventors, while the vibration noises tend to decrease as the rigidity ratio becomes greater, its decreasing quantity is small. Even if the rigidity ratio is made greater than 0.5, the efficient suppression effect of the vibration noises is not obtained. If the rigidity ratio is set to be 0.1 or greater and 0.5 or smaller, the suppression of the vibration noises and the weight reduction can be compatibly attained properly.

Moreover, the present electric motor vehicle may be configured such that the intermediate part is a cylindrical spacer, and the attaching bracket is attached to the lower face of the floor frame by inserting a bolt into the spacer and fastening the bolt into a nut.

The fastening with the bolt and the nut via the spacer can provide properly-easy attachment by using existing parts. Accordingly, the effective attachment of the battery unit can be attained easily and cheaply.

The spacer may be formed integrally with the attaching bracket or separately from the attaching bracket.

The stable rigidity can be secured by forming the spacer with the attaching bracket integrally. In a case where the spacer is formed separately from the attaching bracket, the height can be easily changed by exchanging the spacer. Further, common use of the attaching bracket becomes possible.

Herein, inertance can be used as the predetermined specific value relating to rigidity.

Specifically, by measuring acceleration which is generated when a specified exciting force is inputted, in the vehicle width direction, to each of the above-described section and the above-described other section of the attachment portion of the battery unit to the floor frame, the inertance which is a ratio of the acceleration generated to the specified exciting force inputted can be obtained for each of the section and the other section of the attachment portion of the battery unit to the floor frame. Then, the rigidity ratio (Rb/Rf) can be set by considering that the inertance obtained for the section of the attachment portion of the battery unit to the floor frame is the rigidity (Rb) and the inertance obtained for the other section of the attachment portion of the battery unit to the floor frame is the rigidity (Rf).

The inertance is the known transfer function relating to the rigidity. What is needed here is not the value (quantity) of the rigidity itself but the ratio of the rigidity, i.e., the rigidity ratio (dimensionless number). The inertance enables comparison of the rigidity, so that the rigidity ratio can be set without obtaining the rigidity value. Moreover, the iterance can facilitate the precise measuring. Accordingly, appropriate and easy correspondence to any situations, such as a location where the measuring is difficult or a case where there are many measuring points, can be attained by using the inertance. Especially, the measuring of the attachment portion positioned below the vehicle body can be properly conducted.

Herein, it is preferable that the exciting force having a frequency band of 110-140 Hz be used in obtaining the inertance.

With respect to the vibration noises caused by the vibration of the floor frame, the vibration noises (road noises) of the intermediate frequency band of about 125 Hz become a problem especially. Accordingly, the vibration noises can be suppressed effectively by using the exciting force having the frequency band of 110-140 Hz in obtaining the inertance for setting the rigidity ratio.

Further, the present electric motor vehicle may be configured such that the battery case comprises a battery tray where the battery modules are placed and a battery frame which is configured to have a closed-cross section structure and surrounds the battery tray, and a lower face of the battery tray is located substantially at the same level as the lower face of the battery frame.

In a case where the battery frame surrounding the battery tray has the closed-cross section structure, the battery frame having light weight and high rigidity can be provided. Further, in a case where the lower face of the battery tray is located substantially at the same level as the lower face of the battery frame, a side part (entire periphery) of the battery tray is enclosed by the battery frame. Accordingly, the periphery of the battery tray can be protected by the battery frame having the high rigidity.

Moreover, the present electric motor vehicle may be configured such that a portion of the floor panel which vertically faces the battery unit is formed by a flat panel where a tunnel portion extending in the longitudinal direction is not provided.

In a case where the tunnel portion extending in the longitudinal direction is provided, the floor panel is configured to protrude upwardly. Thereby, a cabin space becomes narrow, so that passenger's smooth getting on and off may be hindered. Meanwhile, if the floor panel is flat without the tunnel portion, the cabin space is so enlarged that the accessibility is improved. However, the flat floor panel decreases the rigidity of the vehicle body, so that the floor panel and the floor frame tend to vibrate easily. Therefore, there is a concern that the vibration noises may increase. According to the present electric motor vehicle, however, since the battery unit is attached to the floor frame with the specified rigidity ratio capable of suppressing the vibration noises, such increasing of the vibration noises can be suppressed as well.

Further, the present electric motor vehicle may be configured such that a connection portion of a bracket attachment portion which is provided at a specified point of the lower face of the floor frame and the attaching bracket are attached via a spacer which is the intermediate part, whereby the rigidity ratio is set 0.1 or greater.

Additionally, another aspect of the present invention is an electric motor vehicle which comprises a floor panel constituting a lower face of the vehicle, a pair of floor frames provided to be spaced apart from each other at both sides of the vehicle and extending in a longitudinal direction, the floor frames being attached to the lower face of the floor panel so as to respectively form a hollow prism-shaped closed-cross section structure together with the floor panel, and a battery unit attached to respective lower faces of the floor frames at both sides thereof and arranged below the floor panel, wherein the battery unit comprises plural battery modules, a battery case storing the battery modules therein, and an attaching bracket protruding substantially horizontally from the battery case and positioned just below the lower face of the floor frame with a distance therebetween, a bracket attachment portion where the attaching bracket is attached is provided at the lower face of the floor frame, the battery unit is attached to the floor frame by connection of the bracket attachment portion and the attaching bracket, and the attaching bracket is attached to the lower face of the floor frame via a spacer such that a rigidity ratio (Rb/Rf) which is a ratio of rigidity (Rb), in a vehicle width direction, of the bracket attachment portion itself to rigidity (Rf), in a vehicle width direction, of the attaching bracket including the spacer is 0.1 or greater.

The present invention will become apparent from the following description which refers to the accompanying drawings.

DETAILED DESCRIPTION OF THE INVENTION

Figure 1:
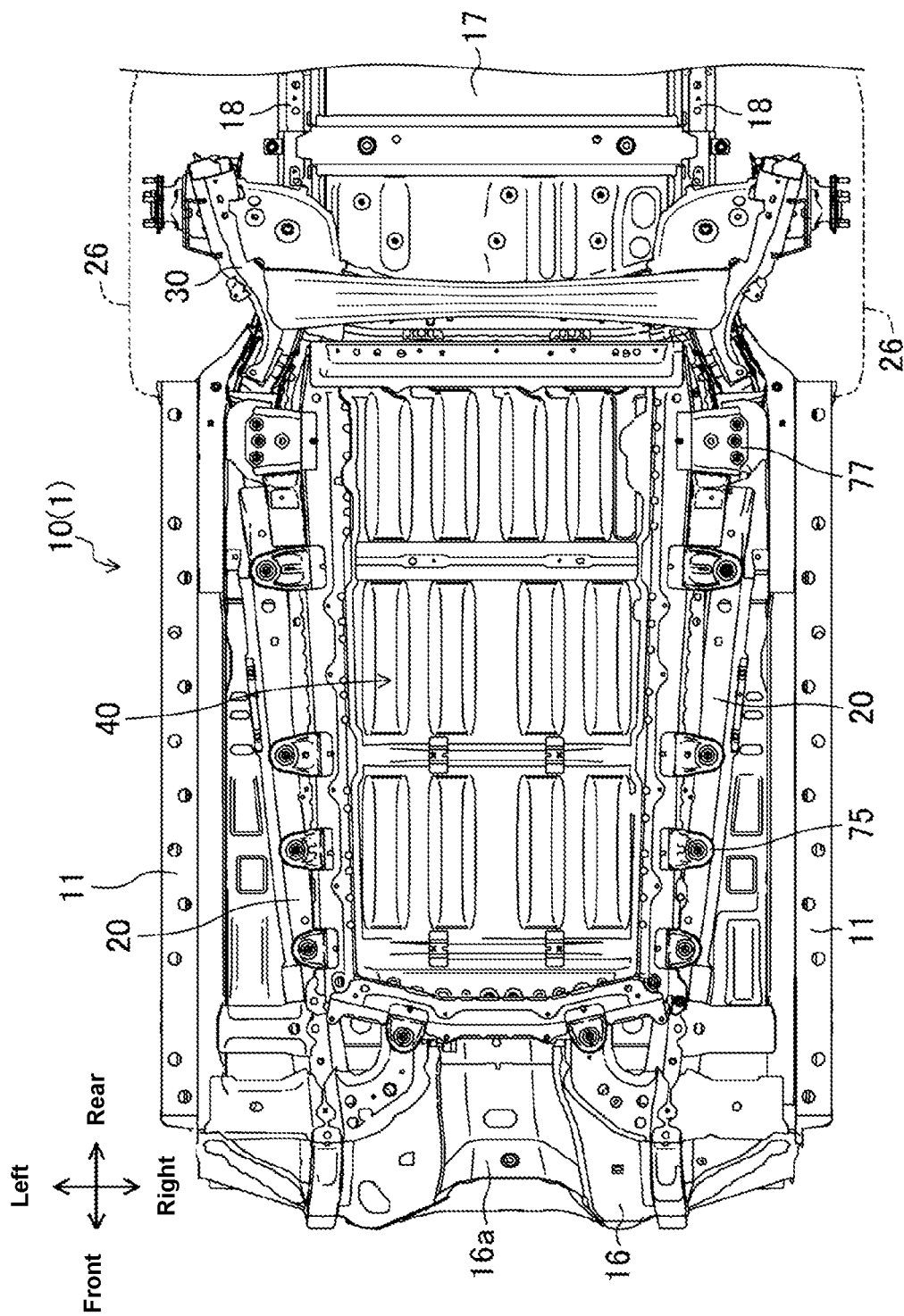
FIG. 1 is a schematic view of a lower part of a vehicle body of an electric motor vehicle, when viewed from a downward side.

Hereafter, the present invention will be described by a specific embodiment. The following description shows one example. Longitudinal, lateral, and vertical directions are respectively shown by arrows in the drawings. Herein, these directions are defined based on a vehicle. Accordingly, the lateral direction corresponds to a vehicle width direction.

[Main Structure of Electric Motor Vehicle]

Figure 2A:
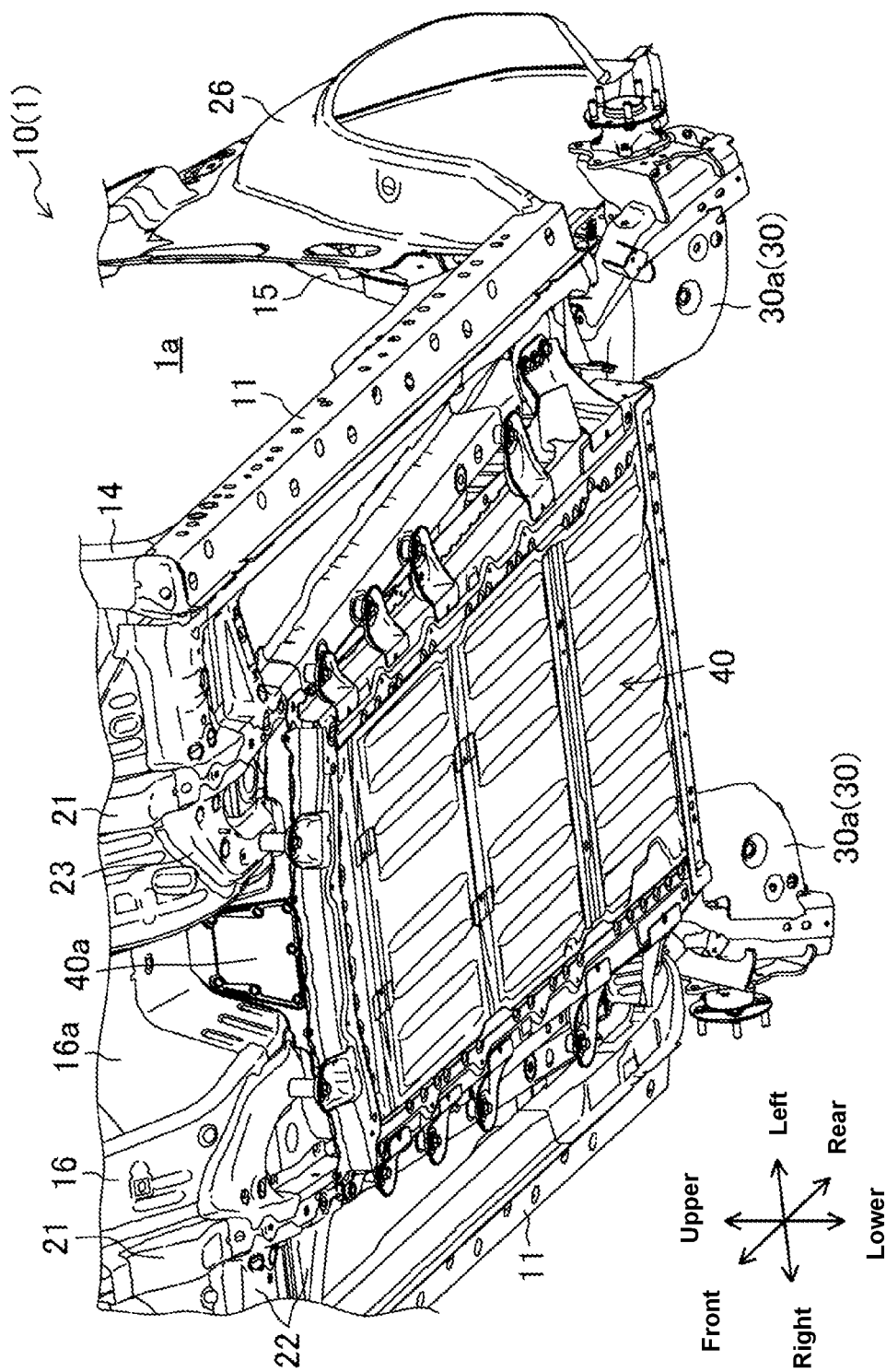
FIG. 2A is a schematic perspective view of the lower part of the vehicle body of the electric motor vehicle, when viewed from an oblique forward side.
Figure 2B:
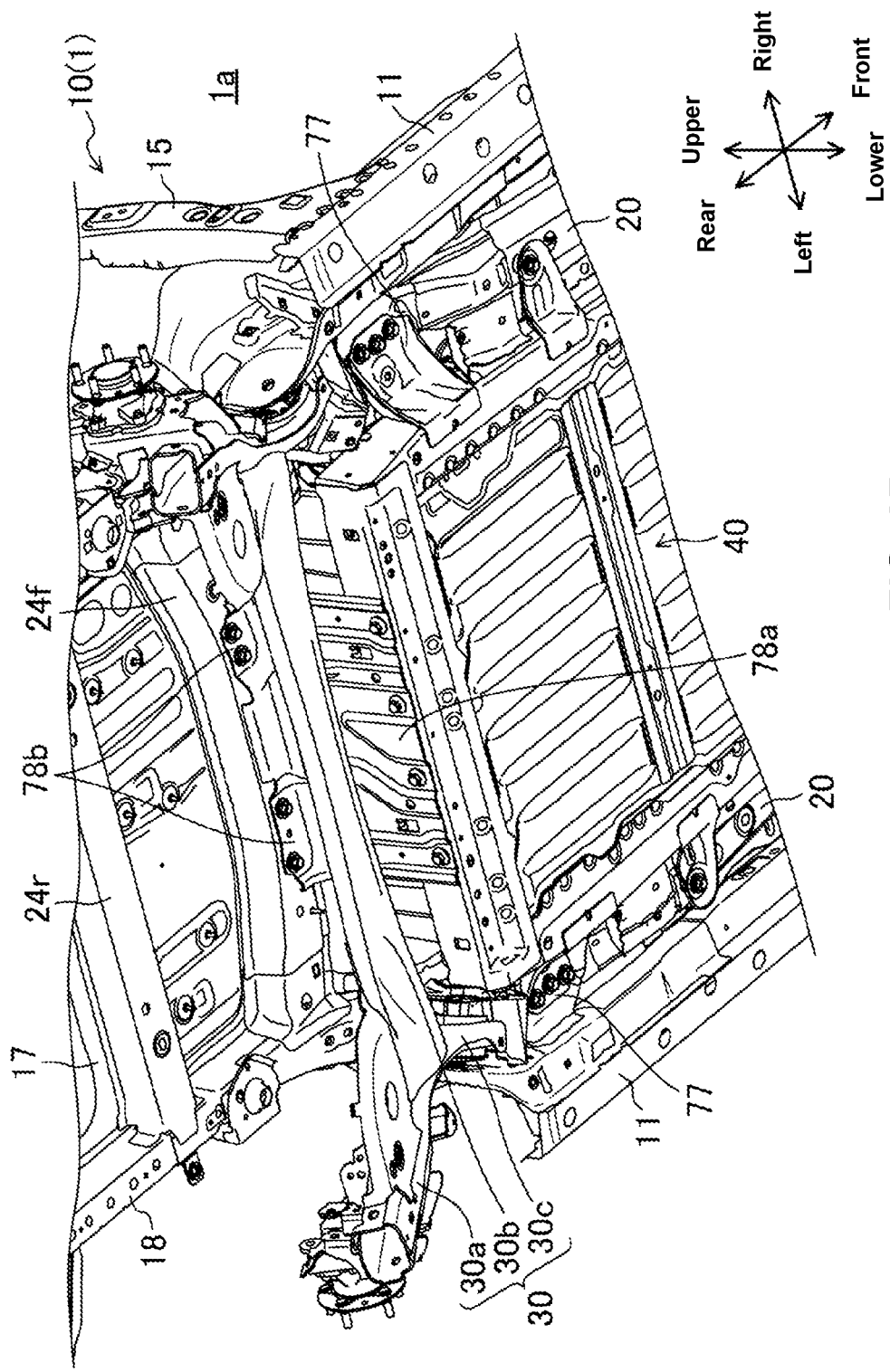
FIG. 2B is a schematic perspective view of the lower part of the vehicle body of the electric motor vehicle, when viewed from an oblique rearward side.

An electric motor vehicle 1 of the present embodiment is shown in FIGS. 1, 2A and 2B. FIG. 1 is a view of a lower part of a vehicle body 10 of the electric motor vehicle 1, when viewed from a downward side. FIG. 2A is a view of the lower part of the vehicle body 10 of the electric motor vehicle 1, when viewed from an oblique forward side. FIG. 2B is a view of the lower part of the vehicle body 10 of the electric motor vehicle 1, when viewed from an oblique rearward side. These figures show a main structure of the electric motor vehicle 1 according to the present invention.

This electric motor vehicle 1 is an electric automobile driven by electric power. An electric motor is disposed in a machinery room which is partitioned at a front part of the electric vehicle 1, which is not illustrated. A cabin 1a where there are a driver and others is partitioned behind and adjacently to this machinery room. Further, a baggage room is partitioned behind and adjacently to this cabin 1a. The electric motor vehicle 1 is driven by the motor which rotationally drives its front wheels. Herein, the electric motor vehicle 1 may be configured as a hybrid automobile which installs an engine additionally to the motor so as to be driven by combination of these.

The electric motor vehicle 1 further installs a secondary battery (battery unit 40) as a power source to drive the electric motor. The battery unit 40 has large capacity and large weight. Therefore, a place where the battery unit 40 can be installed is limited in the electric motor vehicle 1. In general, the battery unit 40 is configured such that its vertical size is small and its longitudinal and lateral sizes are large, and it is arranged in a space positioned below the vehicle body 10.

(Vehicle Body 10)

Figure 3:
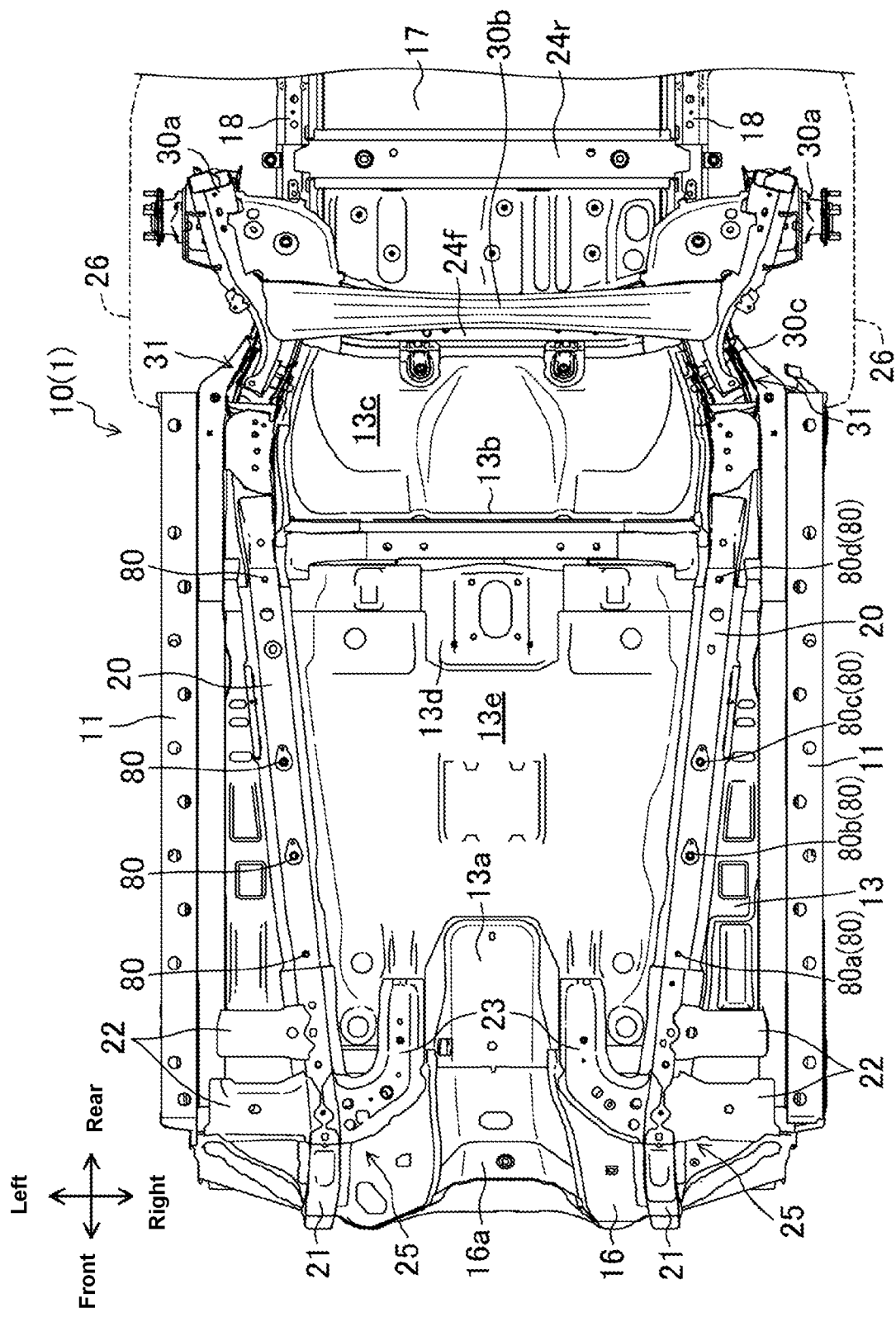
FIG. 3 is a schematic view of the vehicle body without a battery unit, when viewed from the downward side.

A lower part of the vehicle body 10 without the battery unit 40 is shown in FIG. 3. The lower part of the vehicle body 10 is constituted by a pair of right-and-left side sills 11, a floor panel 13, and others.

Figure 7:
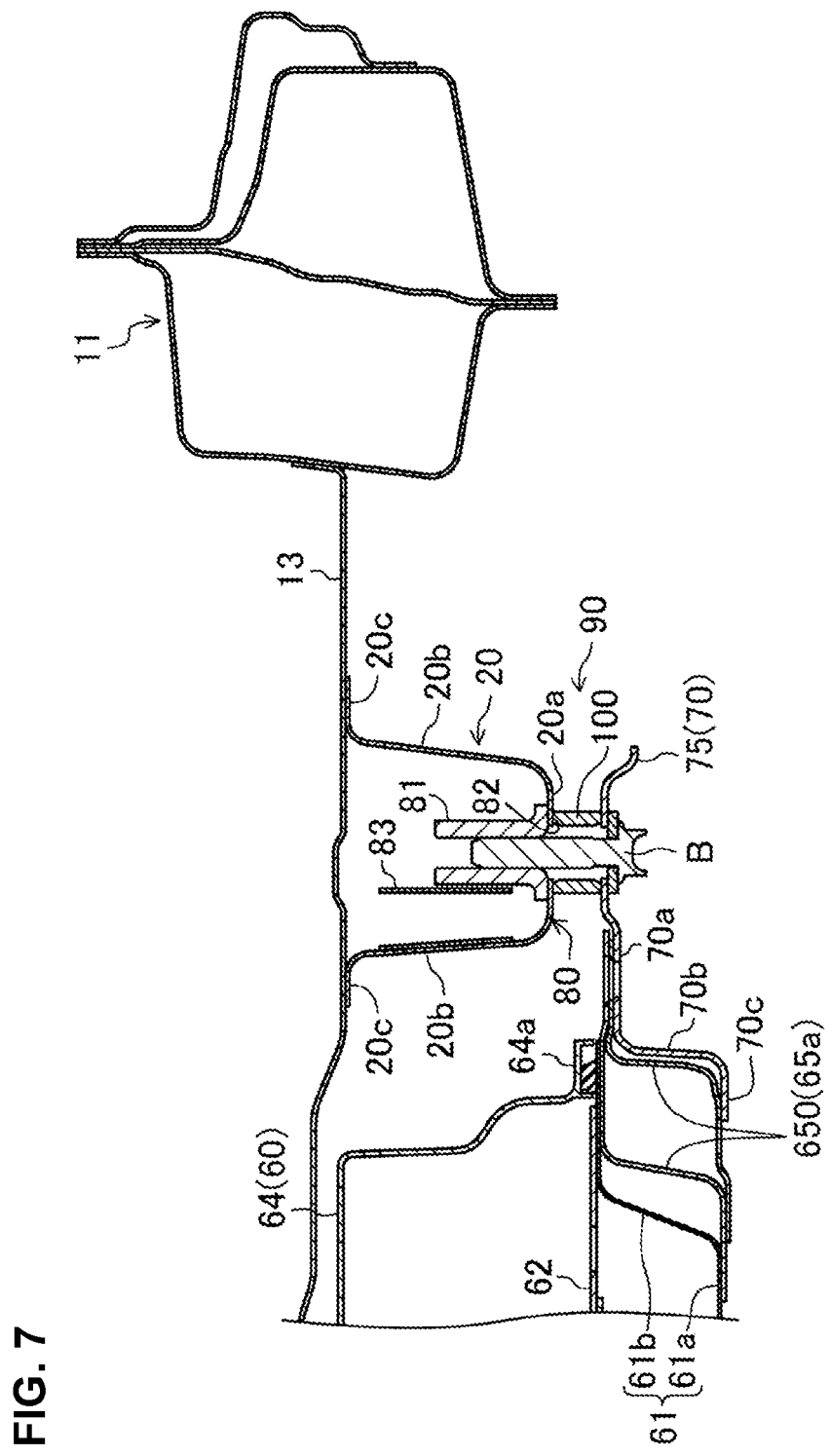
FIG. 7 is a schematic sectional view of the attachment portion (lateral indirect attachment portion) of the lateral indirect attaching bracket.

As shown in FIGS. 2A, 3 and 7, each of the side sills 11 is made of a steel plate having a hollow prism shape so as to have a nearly rectangular closed-cross section structure. The side sills 11 are arranged along respective lower edges of right-and-left sides of the vehicle body 10 and extend in a longitudinal direction in parallel to each other. Respective rear end portions of the both side sills 11 are positioned respective rear corner portions of right-and-left sides of the cabin 1a, and respective front end portions of the both side sills 11 are positioned respective front corner portions of the right-and-left sides of the cabin 1a.

As shown in FIG. 2A, a hollow prism-shaped hinge pillar 14 is connected to an upper side of a front end portion of each of the side sills 11. As shown in FIG. 2B, a hollow prism-shaped rear pillar 15 is connected to an upper side of a rear end portion of each of the side sills 11. The hinge pillars 14 and the rear pillars 15 which are positioned at the both sides extend upwardly such that they longitudinally face each other. In the present electric motor vehicle 1, a so-called center pillar (pillar extending upwardly from an upper side of a middle portion of each of the side sills 11) is omitted.

A front door is pivotally attached to each of the hinge pillars 14 so as to open and close, which is not illustrated. Likewise, a rear door is pivotally attached to each of the rear pillars 15 so as to open and close. When these doors are closed, a tip end portion of the front door and a tip end portion of the rear door closely contact each other.

That is, the doors of the present electric motor vehicle 1 which are configured to open and close a side face of the cabin 1a constitute a so-called double door type. Accordingly, since there is no center pillar in the present electric motor vehicle 1, it is easy for passengers to get in or get out of the cabin 1a. Thus, this vehicle 1 has the superior accessibility. Meanwhile, the rigidity of the vehicle body 10 is relatively low compared to a case where the center pillar is provided.

As shown in FIGS. 3 and 7, the floor panel 13 is made of a pressed steel plate or the like, which constitutes a lower face of the cabin 1a primarily. The floor panel 13 is provided between the right-and-left side sills 11 such that it covers over the side sills 11. A front edge portion of the floor panel 13 is connected to a lower edge portion of a dash panel 16 which partitions the cabin 1a from the machinery room. As shown in FIG. 2A, the dash panel 16 extends from a connection point to the floor panel 13 such that it curves and extends obliquely upwardly.

A short tunnel portion 16a having an inverse U-shaped cross section which is recessed upwardly and extends in a longitudinal direction is formed at a middle portion, in the vehicle width direction, of the dash panel 16. The short tunnel portion 16a protrudes rearwardly from the dash panel 16 toward the floor panel 13. Herein, in the present electric motor vehicle 1, a slant groove 13a (a nearly triangular-shaped groove in a side view) which constitutes a rear end part of the short tunnel portion 16a is formed at a front end portion of the floor panel 13. A long tunnel portion extending longitudinally is not provided at the floor panel 13 of the present electric motor vehicle 1 unlike general vehicles.

That is, a large part of the floor panel 13 is configured as a flat panel 13e which has a nearly flat-shaped cross section, in the vehicle width direction, thereof. Accordingly, since there is no long tunnel portion inside the cabin in the present electric motor vehicle 1, the cabin 1a becomes wide. Thus, this vehicle 1 has the superior accessibility. Meanwhile, the rigidity of the vehicle body 10 is relatively low compared to a case where the long tunnel portion is provided.

A step portion 13b which rises upwardly by one step is provided at a rear portion of the floor panel 13. Accordingly, a portion (rear end portion 13c) of the floor panel 13 which is positioned on a rearward side of the step portion 13b extends nearly horizontally in a state where it shifts upwardly. A connection recess portion 13d which has an insertion hole is formed at a portion of the floor panel 13 which is positioned on a forward side of the step portion 13b.

A rear panel 17 which constitutes a lower face of the baggage room is connected to a rear side of the rear end portion 13c of the floor panel 13. The rear panel 17 is positioned on the rearward side of the rear end portions of the pair of side sills 11. The rear panel 17 is provided between a pair of rear side frames 18 which extend rearwardly in parallel to each other and covers over these rear side frames 18.

Various members to reinforce the vehicle body 10 are attached to the respective lower faces of the dash panel 16, the floor panel 13, and the rear panel 17. Specifically, floor frames 20, front frames 21, torque boxes 22, reinforcements 23, cross members 24f, 24r and others are attached. Each of these members is made of a pressed steel plate. Further, each of these members has a nearly hat-shaped cross section. These members are attached to the lower faces of the panels, thereby forming a hollow prism-shaped closed-cross section structure.

Figure 6:
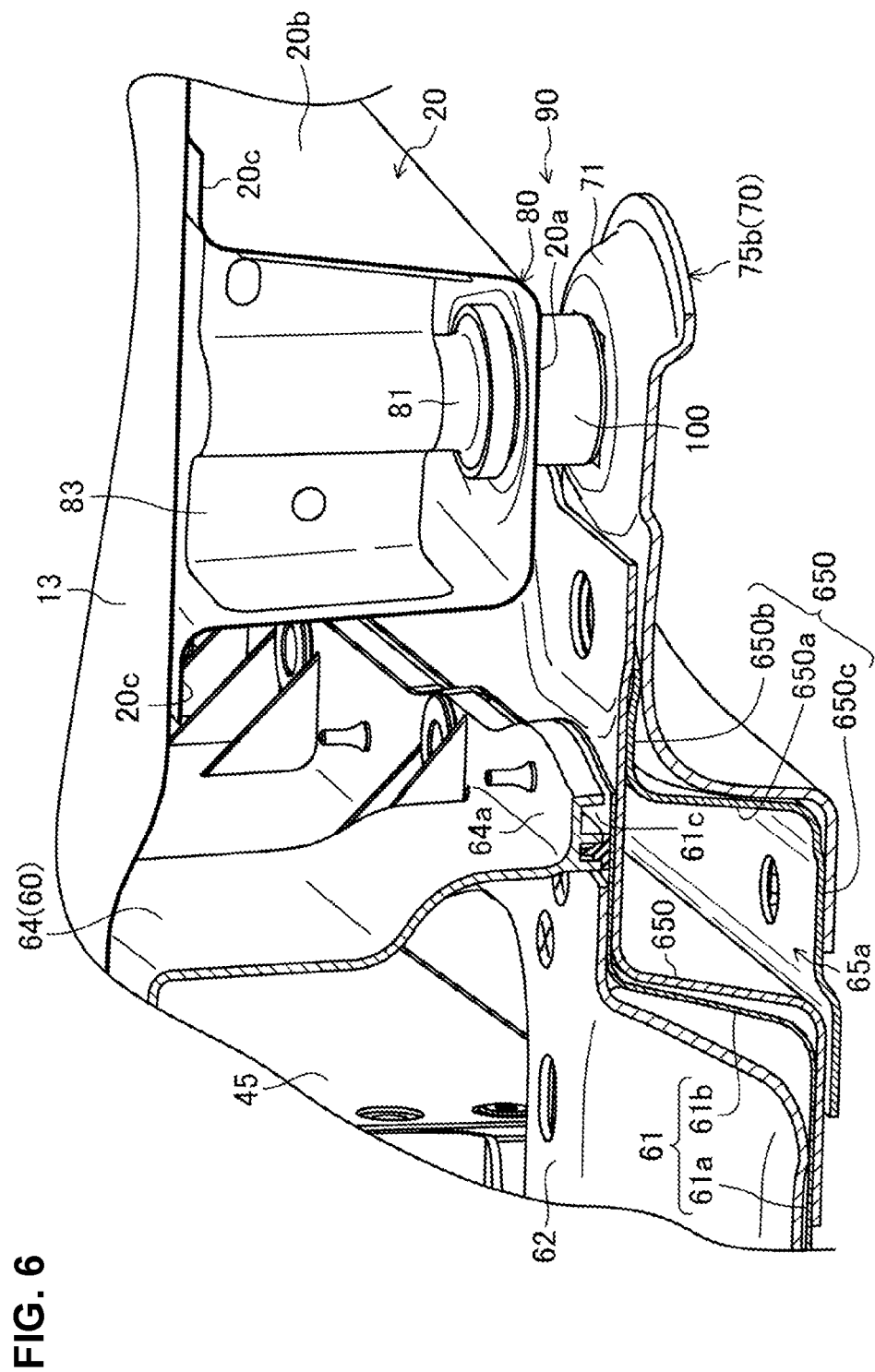
FIG. 6 is a schematic perspective view of an attachment portion (lateral indirect attachment portion) of the lateral indirect attaching bracket.

For example, as shown in FIGS. 6 and 7, the floor frame 20 comprises a belt-shaped lower wall portion 20a, a pair of side wall portions 20b which are provided to face each other at both-side edges of the lower wall portion 20a and extend along the lower wall portion 20a, and a pair of flange portions 20c which protrude, in an opposite direction to each other, along respective upper edges of the both-side wall portions 20b. The both-side flange portions 20c of the floor frame 20 are attached to the lower face of the floor panel 13, thereby forming a hollow prism-shaped closed-cross section structure.

As shown in FIG. 3, a pair of floor frames 20 are configured to be laterally symmetrical. That is, the both floor frames 20 are separated from each other laterally and positioned inwardly adjacently to the both side sills 11. Further, the both floor frames 20 are provided to extend obliquely relative to the longitudinal direction such that their front sides becomes closer to each other and becomes farther from the side sills 11.

Respective rear end portions of the front frames 21 are connected to respective tip end portions of the floor frames 20. As shown in FIG. 2A, each of the front frames 21 is attached to the lower face of the dash panel 16 such that it curves and extends obliquely upwardly. Two torque boxes 2 are provided longitudinally at a position located between a portion where the floor frame 20 and the front frame 21 are connected and the adjacent side sill 11.

Further, a pair of reinforcements 23 are arranged between respective front-side frame connection portions 25 and the short tunnel portion 16a. Each of the reinforcements 23 is constituted by a member extending in a nearly J shape. Respective curved end portions of the reinforcements 23 are connected to respective side faces of the floor frames 20. The reinforcements 23 are attached to respective lower faces of the rear end portion of the dash panel 16 and the front end portion of the floor panel 13 in a state where their extension-side end portions are directed rearwardly. Respective rear portions of the both reinforcements 23 extend along both sides of the short tunnel portion 16a up to a middle position of the short tunnel portion 16a.

As shown in FIGS. 2B and 3, the two cross members 24f, 24r are provided to extend between a pair of rear side frames 18. These cross members 24f, 24r are apart from each other in the longitudinal direction and attached to the rear panel 17. The front-side cross member 24f is provided to extend along a connection portion of the rear panel 17 and the floor panel 13.

A wheel house 26 which accommodates a rear wheel is attached on the rearward side of the side sill 11. A rear suspension 30 is positioned below the wheel house 26.

As shown in FIGS. 2B and 3, the rear suspension 30 (so-called torsion beam type of suspension) comprises a pair of right-and-left trailing arms 30a which pivotally support the respective rear wheels and a torsion beam 30b which extends in the vehicle width direction and interconnects the trailing arms 30a. Each of the trailing arms 30a is attached to a portion (rear-side frame connection portion 31) where the floor frame 20 and the rear side frame 18 are connected via an arm bracket 30c.

(Battery Unit 40)

Figure 4A:
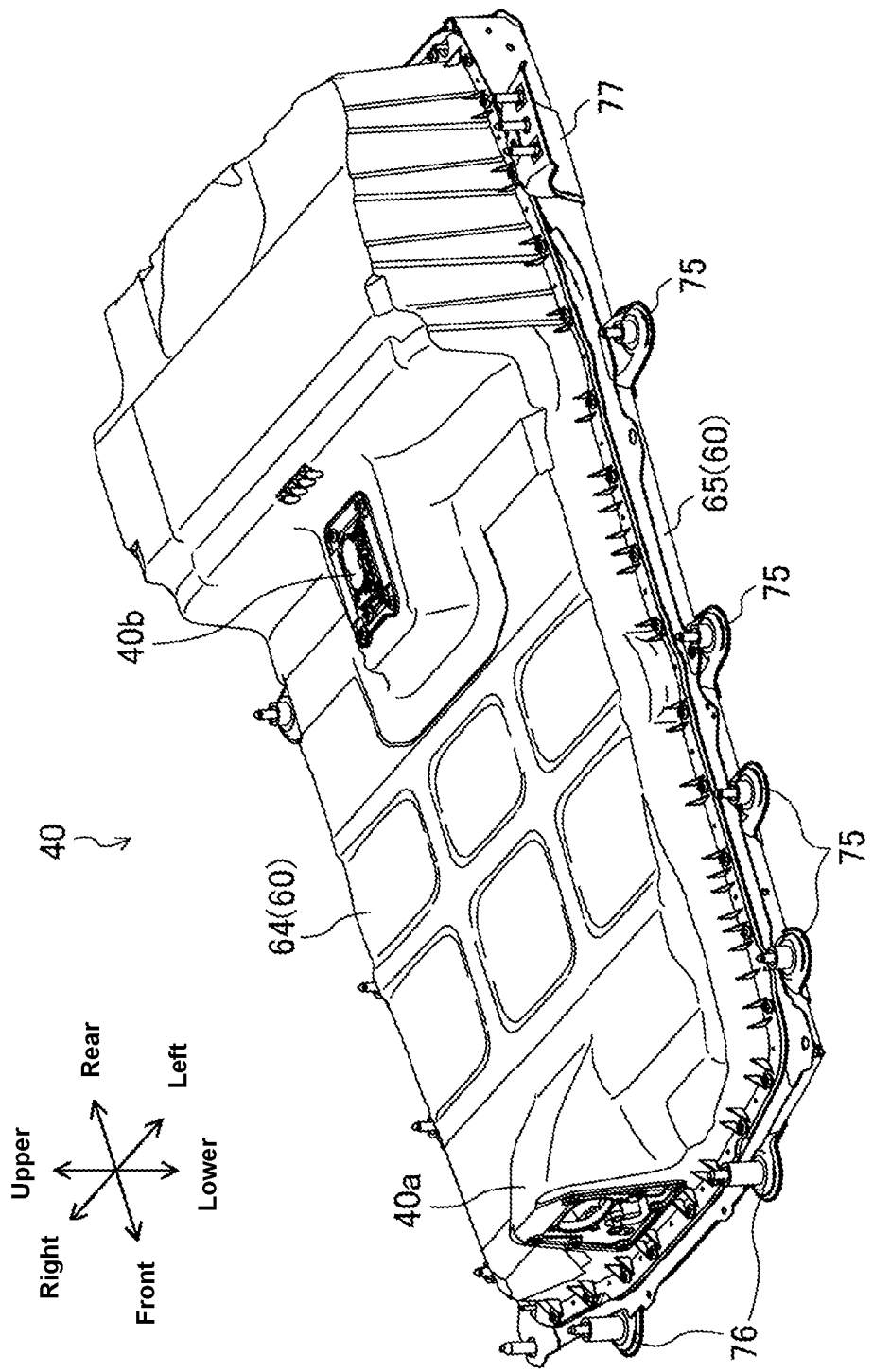
FIG. 4A is a schematic perspective view of the battery unit, when viewed from an oblique upward side.

As shown in FIG. 4A, the battery unit 40 is configured as a single member itself which is attached to the vehicle body 10. The gross weight of the battery unit 40 is about 300 kg, for example. The battery unit 40 is arranged in a space positioned below the vehicle body 10.

That is, the battery unit 40 is arranged below the floor panel 13 such that it extends along the floor panel 13. As shown in FIGS. 1 and 3, a portion of the floor panel 13 which vertically faces the battery unit 40 is constituted by the flat panel 13e. This portion has no long tunnel portion extending in the longitudinal direction. Accordingly, the wide cabin 1a can be provided. Thus, the battery unit 40 can be arranged efficiently by utilizing a limited space positioned below the vehicle body 10.

The battery unit 40 is made of a plate member having small thickness in the vertical direction. The battery unit 40 has a nearly rectangular shape in a plan view such that its longitudinal width is longer than its lateral width. A lower face of the battery unit 40 is nearly flat.

A rear-side portion of an upper face of the battery unit 40 is configured to rise upwardly by one step from a front-side portion and a middle portion of the battery unit 40 so as to correspond to a shape of the floor panel 13. A front-side protrusion portion 40a which engages with the slant groove 13a of the floor panel 13 is provided at a front end portion of the battery unit 40. A rear-side protrusion portion 40b which engages with the connection recess portion 13d of the floor panel 13 is provided at an middle portion of the battery unit 40.

As shown in FIGS. 4A-4D, the battery unit 40 mainly comprises plural (sixteen: in the shown example) battery modules 45 and a battery case 60 which stores the battery modules 45 therein. The battery case 60 comprises a battery tray 61, a battery cover 64, a battery frame 65, and others.

(Battery Case 60)

Figure 4B:
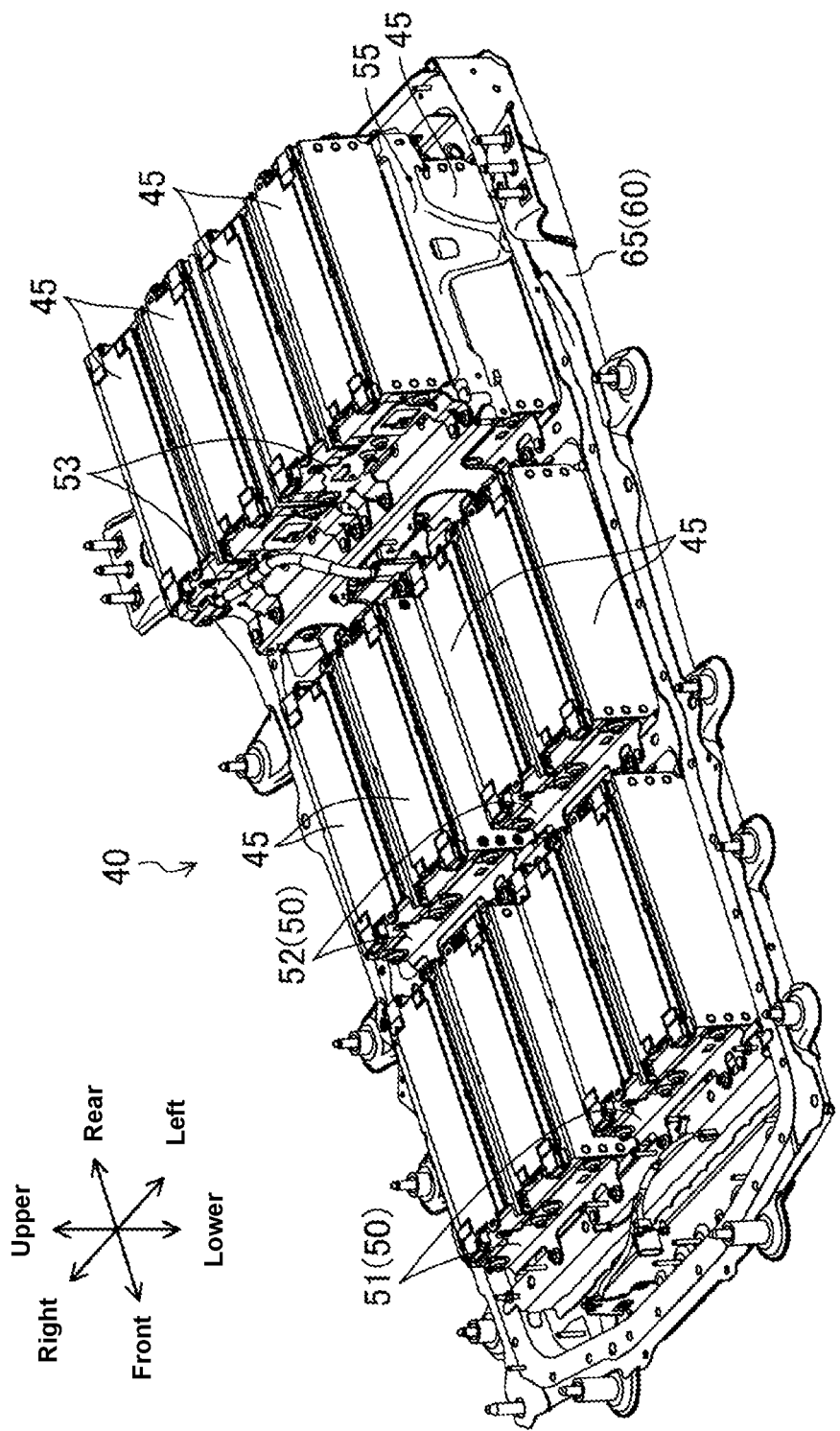
FIG. 4B is a schematic perspective view of an inside of the battery unit without a battery cover.
Figure 4C:
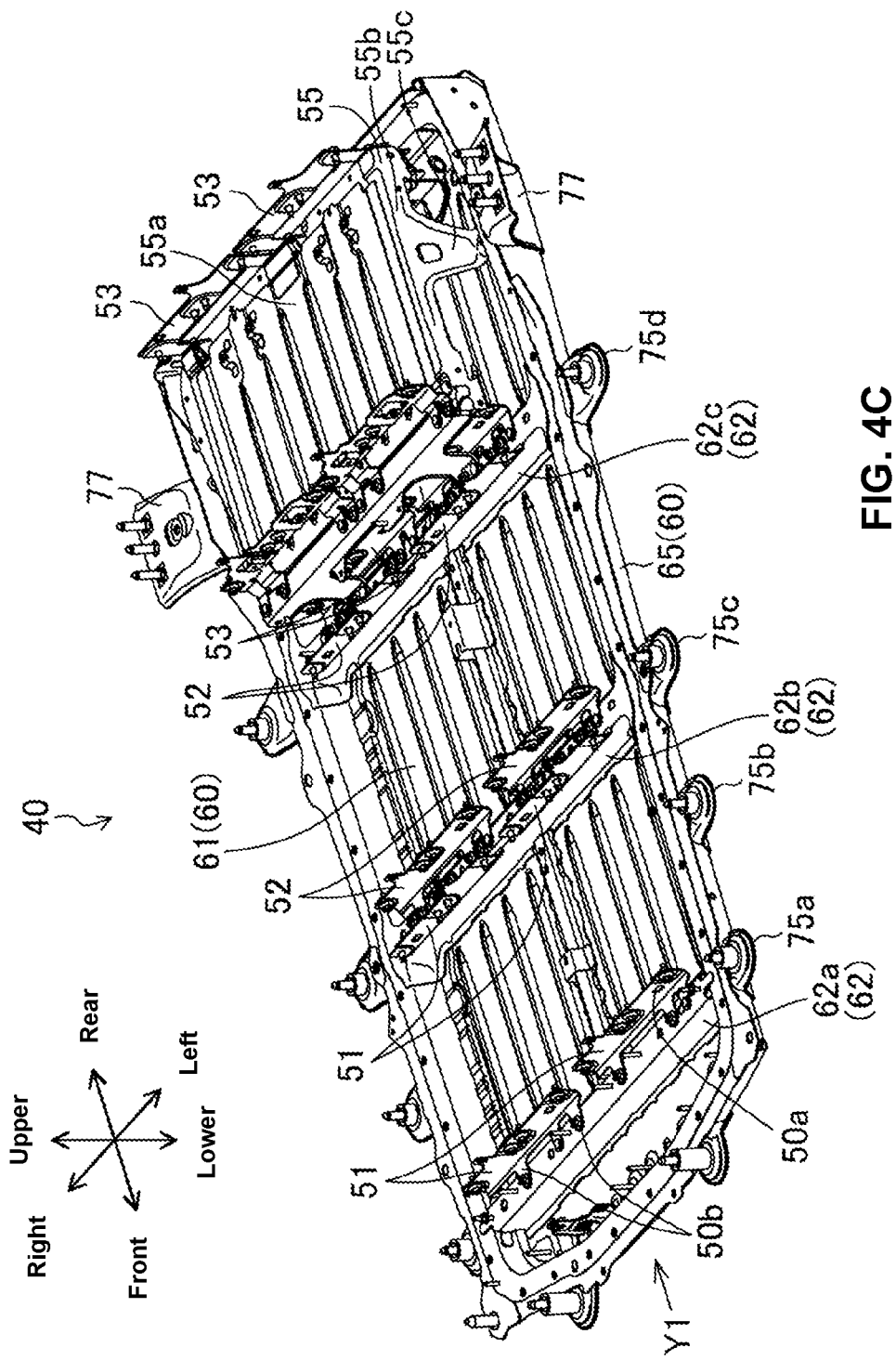
FIG. 4C is a schematic perspective view of a lower part of a battery case.
Figure 4D:
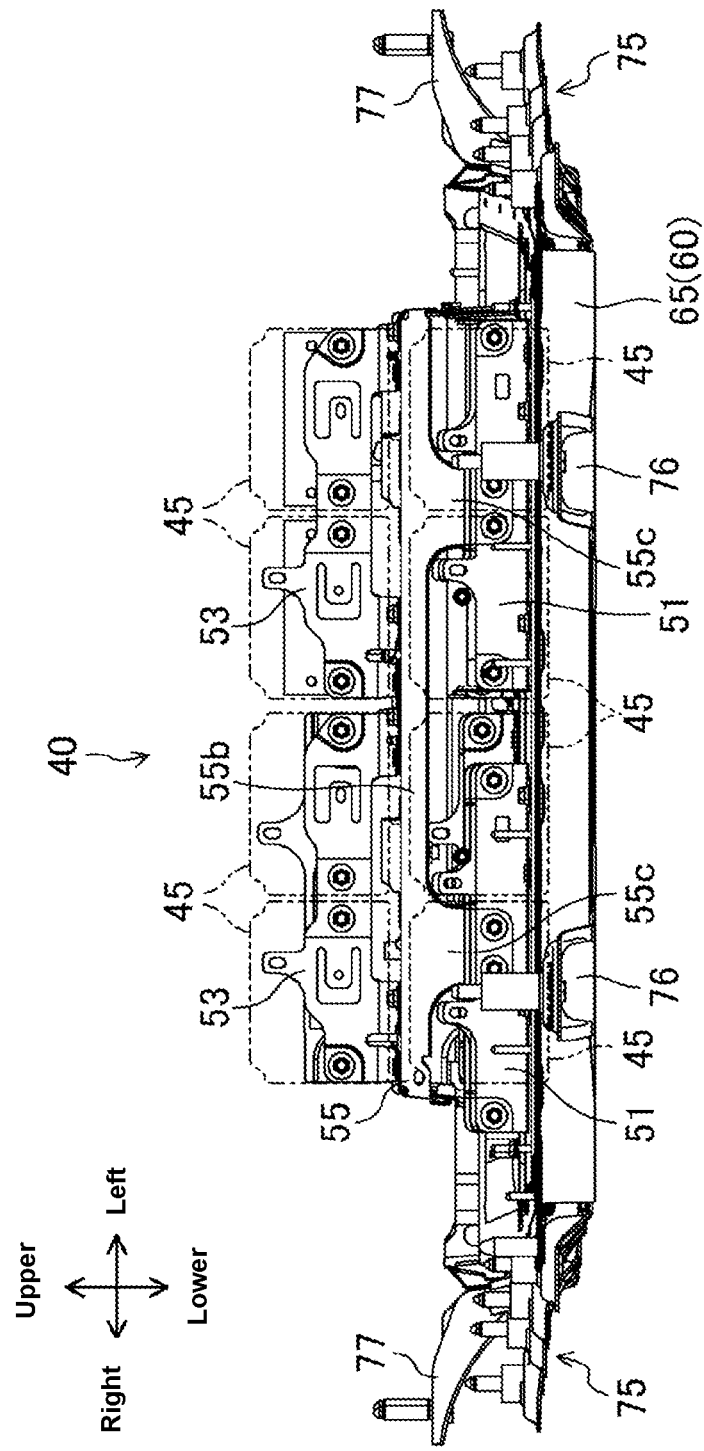
FIG. 4D is a schematic view, when viewed from a direction shown by an arrow Y1 in FIG. 4C.
Figure 4E:
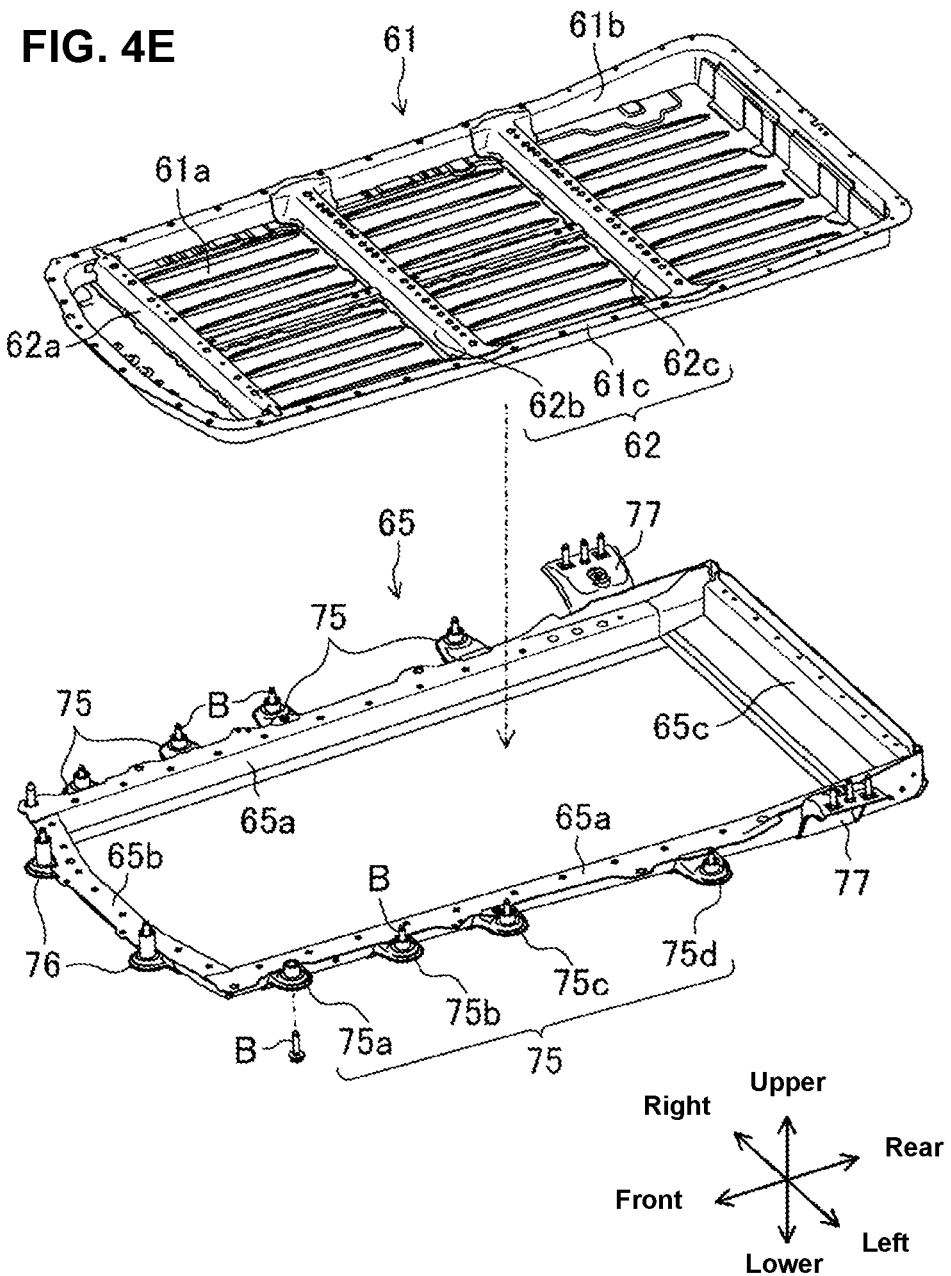
FIG. 4E is a schematic perspective view of an exploded lower part of the battery case.

As shown in FIGS. 4C and 4E, a lower face of the battery case 60 is constituted by the battery tray 61. The battery tray 61 is a container-shaped member which is opened upwardly and has a shallow bottom. Specifically, the battery tray 61 comprises a lower face portion 61a which has a rectangular shape such that its longitudinal width is greater, a frame-shaped peripheral face portion 61b which extends continuously around the lower face portion 61a, a lower joint portion 61c which slightly protrudes outwardly from an upper edge of the peripheral face portion 61b, and plural (three: in the shown example) extension frames 62 (a front extension frame 62a, a middle extension frame 62b, and a rear extension frame 62c).

Each of the extension frames 62 is made of a member having a nearly hat-shaped cross section similarly to the floor frame 20 and the like. Each of the extension frame 62 is attached to the lower face portion 61a and the peripheral face portion 61b by welding, thereby forming a closed-cross section structure. The rigidity of the battery tray 61 is reinforced by the extension frames 62. These extension frames 62 are also utilized as supporting members to support the battery modules 45. Accordingly, the extension frames 62 are provided to extend in the lateral direction at specified intervals in the longitudinal direction. Respective upper faces of the extension frames 62 are located substantially at the same level as the upper face of the battery tray 61.

As shown in FIGS. 4A, 6 and 7, the battery cover 64 is made of a case-shaped member which is opened downwardly, and constitutes an upper face and a side face of the battery case 60. An upper joint portion 64a which has a shape corresponding to the lower joint portion 61c is provided around a lower edge of the battery cover 64. The upper joint portion 64a is joined to the lower joint portion 61c via a seal member in a state where the battery cover 64 is placed onto the battery tray 61. Thereby, the battery cover 64 and the battery tray 61 are integrated, so that its inside is sealed.

As shown in FIG. 4E, the battery frame 65 is a rectangular-shaped member which surrounds the battery tray 61. The battery unit 40 is supported at the vehicle body 10 via the battery frame 65. The battery frame 65 comprises a pair of side frame portions 65a which extend, facing each other in the lateral direction, a front frame portion 65*b* which extends between respective front end portions of the side frame portions 65*a*, and a rear frame portion 65*c* which extends between respective rear end portions of the side frame portions 65*a*.

Each of the side frame portion 65*a*, the front frame portion 65*b*, and the rear frame portion 65*c* is made of plural steel plates and formed in a hollow prism shape. Specifically, as shown in FIGS. 6 and 7, each of these is made of two bent steel plates 650. This steel plate 650 comprises a vertical plate portion 650*a* which extends in a belt shape and an upper plate portion 650*b* and a lower plate portion 650*c* which protrude from both edges of the vertical plate portion 650*a* in an opposite direction, and is bent such that its cross section is of a nearly Z shape.

The two steel plates 650 are positioned such that they are offset from each other, and then their upper plate portions 650*b* and their lower plate portions 650*c* are respectively joined together. Thereby, a nearly rectangular-shaped closed-cross section structure is formed at each of the side frame portion 65*a*, the front frame portion 65*b*, and the rear frame portion 65*c*. Accordingly, the battery frame 65 is configured to have light weight and high rigidity.

The battery tray 61 is made to engage with the battery frame 65 from above and these are integrated. Specifically, the lower joint portion 61*c* of the battery tray 61 is placed onto the upper face of the upper face (upper faces of the upper plate portions 650*b*) of the battery frame 65, and then fixedly welded together. Thereby, the upper face of the battery tray 61 is located substantially at the same level as the upper face of the battery frame 65.

Herein, a lower face (a lower face of the lower face portion 61*a*) of the battery tray 61 is provided to be located substantially at the same level as the lower face (lower faces of the lower plate portions 650*c*) of the battery frame 65. A side part of the battery tray 61 is surrounded by the battery frame 65. Accordingly, a peripheral part of the battery tray 61 is protected by the battery frame 65.

Further, the battery frame 65 is provided with plural supporting members for attachment to the vehicle body 10. Specifically, as shown in FIG. 4E, front indirect attaching brackets 76, lateral indirect attaching brackets 75, and lateral direct attaching brackets 77 are provided at the side frame portions 65*a* and the front frame portion 65*b*, respectively. In the present embodiment, the lateral indirect attaching bracket 75 corresponds to an "attaching bracket" of the invention.

Two brackets as the front indirect attaching brackets 76 are provided at the front frame portion 65*b*. These front indirect attaching brackets 76 are provided to be apart from each other in the lateral direction. Four brackets as the lateral indirect attaching brackets 75 are provided at each of the side frame portion 65*a* symmetrically (first-fourth lateral indirect attaching brackets 75*a*-75*d*).

Specifically, as shown in FIG. 4C, the first indirect attaching brackets 75*a* are arranged at respective positions which laterally face to both end portions of the front extension frame 62*a*. The third indirect attaching brackets 75*c* are arranged at respective positions which laterally face to both end portions of the middle extension frame 62*b*. The second lateral indirect attaching brackets 75*b* are arranged at respective positions which are located between these first and third lateral indirect attaching brackets 75*a*, 75*c*. The fourth lateral indirect attaching brackets 75*d* are arranged at respective positions which laterally face to both end portions of the rear extension frame 62*c*.

The two lateral direct attaching brackets 77 are provided at respective rear parts of the right-and-left side frame portions 65*a* symmetrically. Each of the lateral direct attaching brackets 77 is arranged at a position, in the longitudinal direction, of the side frame portion 65*a* which is located between the rear extension frame 62*c* and the rear frame portion 65*c*. Structures and attachments of these supporting members will be described later.

(Battery Module 45)

As shown in FIG. 4B, the battery modules 45 are made of the same parts. Each of the battery modules 45 has a rectangular parallelepiped shape. The battery module 45 comprises plural battery cells, which are not illustrated. The battery cell is a lithium-ion battery having a specified rated voltage, for example. The battery cells are electrically connected, so that the battery module 45 is configured to be able to output the high voltage with the large capacity. The weight of the single battery module 45 is about 14 kg, for example.

The sixteen battery modules 45 are supported at a supporting metal fitting 50 and the like, which will be described, and placed on the battery tray 61. Thereby, the battery modules 45 are stored inside the battery case 60 in a state where their longitudinal directions match the vehicle longitudinal direction and they are aligned in upper-and-lower two stages.

In the lower stage of the battery modules 45, there are three rows of battery modules 45 (a front row, a middle row, and a rear row), each of which has the four battery modules 45 aligned in the lateral direction. The four battery modules 45 aligned in the lateral direction are placed onto the above-described rear row of the battery modules 45 positioned in the lower state, whereby the upper stage of the battery modules 45 is constituted.

As shown in FIGS. 4B and 4C, the battery modules 45 positioned in the lower stage are attached to the battery tray 61 via the supporting metal fittings 50 (first-third supporting metal fittings 51, 52, 53). Each of the supporting metal fittings 50 comprises, as shown in FIG. 4C, a belt-plate shaped support portion 50*a* and fixation portions 50*b* which are respectively bent in a nearly L shape from a lower edge of the support portion 50*a*. The supporting metal fitting 50 is integrally made of a pressed steel plate.

The two supporting metal fittings 50 (the first supporting metal fittings 51) are attached to the front extension frame 62*a* in a state where they are aligned laterally. The first supporting metal fitting 51 is attached such that the fixation portion 50*b* is fastened to an upper face of the front extension frame 62*a* in a state where the support portion 50*a* protrudes rearwardly beyond the front extension frame 62*a*.

The four supporting metal fittings 50 (the first and second supporting metal fittings 51, 52) are attached to the middle extension frame 62*b* in a state where they are aligned laterally. That is, the first supporting metal fittings 51 are attached such that the fixation portions 50*b* are fastened to an upper face of the middle extension frame 62*b* in a state where the support portions 50*a* protrude forwardly beyond the middle extension frame 62*a*. The second supporting metal fittings 52 are attached such that the fixation portions 50*b* are fastened to the upper face of the middle extension frame 62*b* in a state where the support portions 50*a* protrude rearwardly beyond the middle extension frame 62*b*.

The four supporting metal fittings 50 (the second and third supporting metal fittings 52, 53) are attached to the rear extension frame 62*c* in a state where they are aligned laterally. That is, the second supporting metal fittings 52 are attached such that the fixation portions 50*b* are fastened to an upper face of the rear extension frame 62c in a state where the support portions 50a protrude forwardly beyond the rear extension frame 62c. The third supporting metal fittings 53 are attached such that the fixation portions 50b are fastened to the upper face of the rear extension frame 62c in a state where the support portions 50a protrude rearwardly beyond the rear extension frame 62c.

Further, the two supporting metal fittings 50 (the third supporting metal fittings 53) are attached to the rear frame portions 65c in a state where they are aligned laterally. The third supporting metal fittings 53 are attached such that the fixation portions 50b are fastened to an upper face of the rear frame portions 65c in a state where the support portions 50a protrude forwardly beyond the rear frame portion 65c.

The four battery modules 45 in the front row are attached to two pairs of first supporting metal fittings 51 facing each other longitudinally such that their front and rear end portions are fastened to the support portions 50a. Likewise, the respective battery modules 45 in the middle row are attached to two pairs of second supporting metal fittings 52 facing each other longitudinally such that their front and rear end portions are fastened to the support portions 50a. The respective battery modules 45 in the rear row are attached to two pairs of third supporting metal fittings 53 facing each other longitudinally such that their front and rear end portions are fastened to the support portions 50a.

The respective battery modules 45 in the lower stage are, as shown in FIG. 4D, arranged such that their lower faces are positioned above the upper face of the battery tray 61. Thereby, a space is formed between the upper face of the battery tray 61 and the lower faces of the battery modules 45. A rubber plate having resiliency is arranged in this space together with a cooling pipe, which is not illustrated. Accordingly, the lower faces of the battery modules 45 are resiliently supported by the battery tray 61.

In the present embodiment, the first supporting metal fitting 51 is made of a steel plate which has smaller thickness than those of which the second and third supporting metal fittings 52, 53 in order to suppress resonance of the battery modules 45. The number of fastening points of the fixation portions 50b regarding the first supporting metal fittings 51 are set to be smaller than those regarding the second and third supporting metal fittings 52, 53. Thereby, there is a difference in the rigidity of the attachment portions (module attachment portions) between the battery modules 45 in the front row and the battery modules 45 in the middle and rear rows, thereby differentiating their specific frequencies.

Herein, the rigidities of these module attachment portions are changeable according to the design of the electric motor vehicle 1. That is, the rigidities of the respective module attachment portions are designed previously so that the resonance can be suppressed, and the plural module attachment portions having the different specific frequencies with specified sizes can be set.

The respective battery modules 45 in the upper stage are attached to the battery tray 61 via a base-shaped supporting frame 55. As shown in FIGS. 4C and 4D, the supporting frame 55 comprises a rectangular plate-shaped floor portion 55a, a rectangular frame-shaped floor frame portion 55b which is attached to a periphery of the floor portion 55a, and plural leg portions 55c which extend downwardly from the floor frame portion 55b. The supporting frame 55 is arranged such that it covers over the battery modules 45 in the rear row.

A pair of leg portions 55c which are provided at a front edge part of the floor frame portion 55b are fixed to an upper face of the rear extension frame 62c. A pair of right-and-left leg portions 55c which are provided at both-side edge parts of the floor frame portion 55b are fixed to the upper face of the battery tray 61. Plural leg portions 55c which are provided at a rear end part of the floor frame portion 55b are fixed to the rear frame portion 65c.

The two supporting metal fittings 50 (third supporting metal fittings 53) are respectively attached to the front edge part and the rear edge part of the floor frame portion 55b similarly to the lower stage. The respective battery modules 45 in the upper stage are attached to the pair of third supporting metal fittings 53 in a state where these battery modules 45 are resiliently supported at the floor portion 55a similarly to the battery modules 45 in the rear row. The specific frequency of the module attachment portions in the upper stage may be differentiated from that of the module attachment portions in the lower stage.

[Attachment of Battery Unit 40 to Vehicle Body 10]

The battery unit 40 is attached to the vehicle body 10 by the lateral indirect attaching brackets 75, the front indirect attaching brackets 76, the lateral direct attaching brackets 77, and the rear direct attaching brackets 78.

(Lateral Indirect Attaching Bracket 75, Front Indirect Attaching Bracket 76)

The lateral indirect attaching bracket 75 and the front indirect attaching bracket 76 (collectively called "indirect attaching bracket 70") are respectively formed by the same-shaped metal fittings. This indirect attaching bracket 70 is made of a pressed steel plate.

Figure 5:
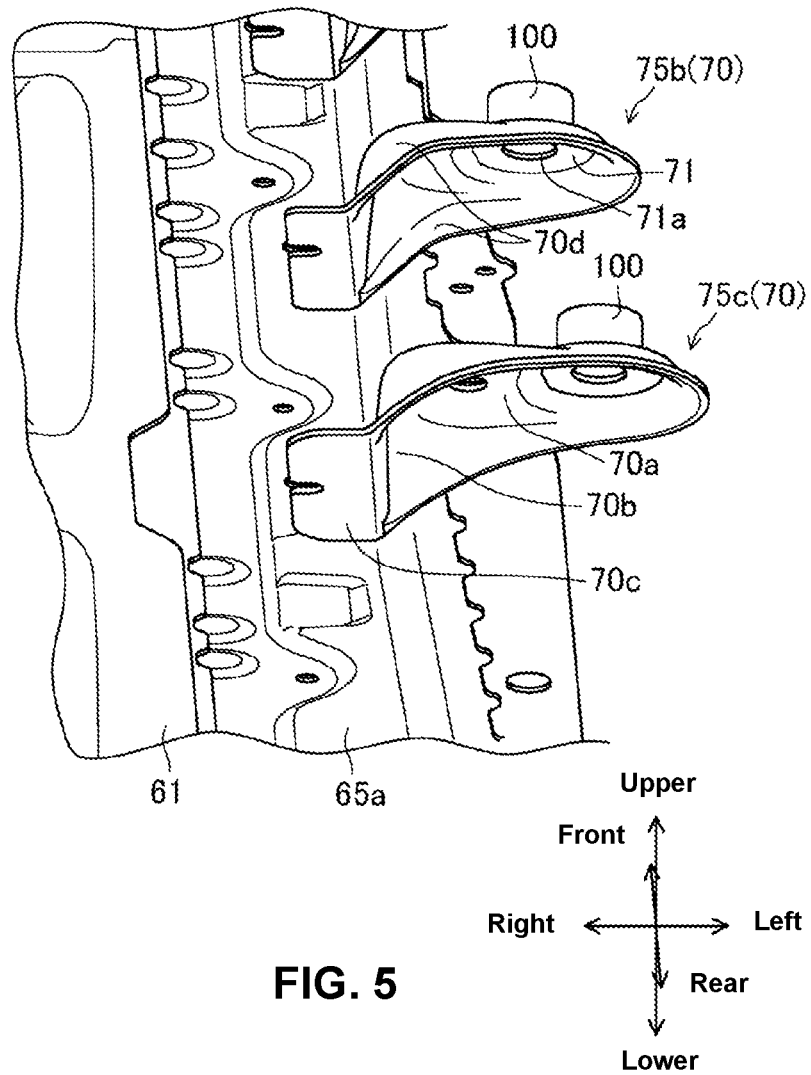
FIG. 5 is a schematic perspective view of indirect attaching brackets (lateral indirect attaching brackets), when viewed from an oblique downward side.

As shown in FIG. 5, the indirect attaching bracket 70 comprises a base portion 70a which is provided at a flat fastening base part 71 where a single bolt hole 71a is formed, a connection portion 70b which is bent downwardly from one end of the base portion 70a so as to have a nearly L-shaped cross section, a projection end portion 70c which projects from a tip of the connection portion 70b in an opposite direction to the base portion 70a, and a pair of reinforcement portions 70d which extend, facing both corner portions between the base portion 70a and the connection portion 70b. Herein, the indirect attaching bracket 70 is provided with a spacer 100, which will be described later.

Edge portions of the base portion 70 and the connection portion 70b and a pair of reinforcement portions 70d are formed three-dimensionally by a curved portion which is curved downwardly and a bent portion which is bent from an outer edge of this curved portion toward a side. Thereby, the rigidity of the indirect attaching bracket 70 is structurally reinforced. Herein, the length of each base portion 70a of the first-fourth lateral indirect attaching brackets 75a-75d is set to be longer as its arrangement position becomes rearward so as to match a slant shape of the floor frame 20.

The front indirect attaching brackets 76 are fastened and fixedly welded to the front frame portion 65b, and the lateral indirect attaching brackets 75 are fastened and fixedly welded to the side frame portions 65a. Specifically, as shown in FIGS. 6 and 7, the upper plate portions 650b are provided to protrude nearly horizontally at the front frame portion 65b and the side frame portions 65a. An upper face of the base portion 70a closely contacts a lower face of the upper plate portion 650b, a side face of the connection portion 70b closely contacts an outer face of the vertical plate portion 650a, and an upper face of the projection end portion 70c closely contacts a lower face of the lower plate portion 650c.

In this state, the front indirect attaching brackets 76 and the lateral indirect attaching brackets 75 are respectively fastened and fixedly welded to the front frame portion 65b and the side frame portions 65a. Thereby, the upper face of the base portion 70a protrudes nearly horizontally substantially at the same level as the upper face of the battery frame 65, so that the fastening base part 71 has a structure which is superior in the rigidity in the vehicle width direction.

(Lateral Direct Attaching Bracket 77, Rear Direct Attaching Bracket 78)

A basic structure of the lateral direct attaching bracket 77 is substantially the same as the indirect attaching bracket 70. Herein, the lateral direct attaching bracket 77 is made of a metal fitting which is larger than the indirect attaching bracket 70. The lateral direct attaching bracket 77 comprises the base portion 70a, the connection portion 70b, and the reinforcement portions 70d which respectively have a relatively-large size. The lateral direct attaching brackets 77 are fastened and fixedly welded to the side frame portions 65a. The fastening base part 71 of the base portion 70a of the lateral direct attaching bracket 77 has plural bolt holes.

The rear direct attaching bracket 78 is made of a metal fitting which is more larger than the lateral direct attaching bracket 77. The rear direct attaching bracket 78 comprises, as shown in FIG. 2B, a rectangular plate-shaped hanging wall portion 78a and a laterally-long wall portion 78b which is bent from an upper edge of the hanging wall portion 78a so as to have a nearly L-shaped cross section. The rear direct attaching bracket 78 is fixed to the rear frame portion 65c by fastening a lower end part of the hinging wall portion 78a to a rear face of the rear frame portion 65c.

The lateral indirect attaching brackets 75, the front indirect attaching brackets 76, the later direct attaching brackets 77, and the rear direct attaching brackets 78 are attached to the vehicle body 10 by fastening bolts B and nuts 81.

Specifically, as shown in FIG. 2B, in the case of the rear direct attaching brackets 78, the laterally-long wall portions 78b are fixedly fastened to a lower face of the front-side cross member 24f. In the case of the lateral direct attaching brackets 77, the fastening base parts 71 of the base portions 70a are directly attached to a lower face of the rear-side frame connection portions 31 by fastening the bolts B and the nuts 81.

As shown in FIG. 3, the first-fourth lateral indirect attaching brackets 75a-75d are attached to the bracket attachment portions 80 which are provided at specified points of the respective lower faces of the floor frame 20 which correspond to their arrangement positions (first-fourth bracket attachment portions 80a-80d) by fastening the bolts B and the nuts 81. The front indirect attaching brackets 76 are also attached to the respective lower faces of the reinforcements 23 similarly to these brackets 75a-75d.

Figure 8:
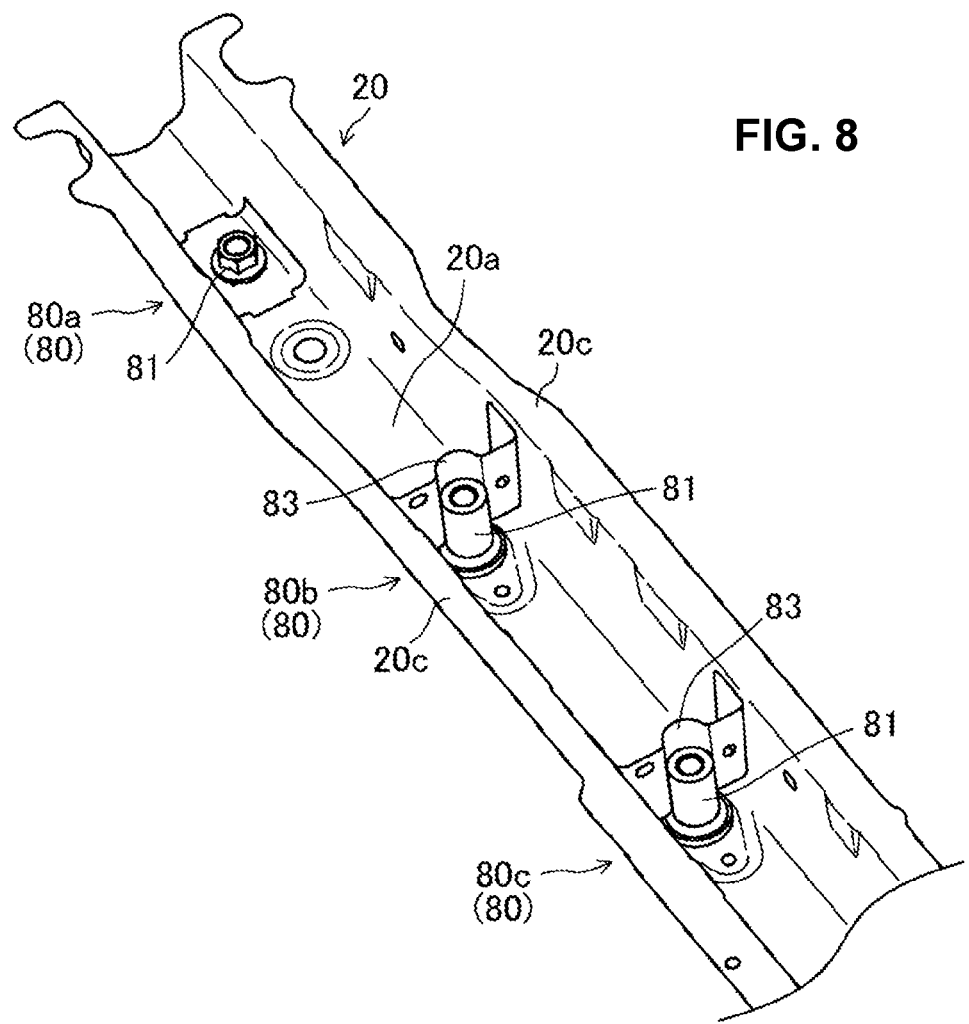
FIG. 8 is a schematic perspective view of an inside of a floor frame.

The nut 81 is fixed to each of the bracket attachment portions 80. Specifically, as shown in FIGS. 6, 7 and 8, a penetration hole 82 for insertion of the bolt B is formed at the lower wall portion 20a. The nut 81 is fixedly welded to an upper face of the lower wall portion 20a (a face exposed to the inside of the closed-cross section structure) coaxially with the penetration hole 82. A distance between the lower wall portion 20a and the floor panel 13 is set such that the distance at each of the second-fourth bracket attachment portions 80b, 80c, 80d is greater than the distance at the first bracket attachment portion 80a.

Accordingly, the small (short) nut 81 is used at the first bracket attachment portion 80a. The tall (long) nuts 81 (pole-shaped nuts 81) are used at the second-fourth bracket attachment portions 80b, 80c, 80d. Further, at the second-fourth bracket attachment portions 80b, 80c, 80d are provided reinforcing plates 83 which are welded to facing surfaces of the both side wall portions 20b at both end portions thereof and extend in the cross-section direction, respectively. An outer peripheral face of each of the pole-shaped nuts 81 is joined to this reinforcing plate, so that the rigidity of the pole-shaped nut 81 for the floor frame 20 is reinforced.

(Problem in Attaching Battery Unit 40 to Vehicle Body 10)

The level (height position) of the lower face of the battery unit 40 is determined by the lowest aboveground height of the vehicle. The level of the upper face of the battery unit 40 is determined by the size, the capacity and the like of the battery module 45. Further, it is necessary that the front-side protrusion portion 40a is made to engage with the slant groove 13a of the floor panel 13 and the rear-side protrusion portion 40b is made to engage with the connection recess portion 13d.

With respect to the vehicle body 10 as well, for example, the size, shape and others of the cross section of the floor frame 20 are determined by the collision safety, the traveling stability, the comfortability (NVH) and the like. The size, shape and others of the cross section of the battery frame 65 are determined by specified conditions as well.

Consequently, there is a problem that the lower face of the floor frame 20 and the upper face of the lateral indirect attaching bracket 75 are vertically apart from each other, so that there occurs a gap therebetween.

In this case, the lateral indirect attaching bracket 75 cannot be directly attached to the floor frame 20. Meanwhile, in a case where the size of the floor frame 20 or the battery frame 65 is changed accordingly, the weight of these frames increases and thereby causes the weight increase of the electric motor vehicle 1 itself, so that the electric-power consumption increases improperly.

If the level is adjusted by bending the base portion 70a, the rigidity, in the vehicle width direction, of the lateral indirect attaching bracket 75 decreases. If the thickness of the lateral indirect attaching bracket 75 is increased, the direct attachment becomes possible, so that this rigidity can be improved. However, the number of the lateral indirect attaching bracket 75 is so many that this may cause the weight increase of the electric motor vehicle 1, thereby increasing the electric power consumption. Therefore, it may be difficult to fix the lateral indirect attaching bracket 75 to the floor frame 20 firmly without weight increasing of the electric motor vehicle 1.

Moreover, vibration noises need to be considered. That is, the floor frames 20 vibrate in a wavy manner, in the vehicle width direction, during vehicle traveling. The battery unit 40 swings laterally accordingly. Consequently, the floor frames 20 and the battery unit 40 resonate in the vehicle width direction, so that there is a case where the noises uncomfortable to passengers may be generated. Particularly, there possibly occurs the problem of the vibration noises (road noises) of the intermediate frequency band of about 125 Hz as the vibration noises caused by the floor frames 20.

In the case of the electric motor vehicle 1, the floor panel 13 is constituted by the flat panel 13e. No center pillar is provided, either. Therefore, the rigidity of the vehicle body 10 decreases relatively, so that the vibration noises tend to be generated easily. The suppression of the vibration noises and the weight reduction are conflicting matters. Therefore, it may be difficult that the battery unit 40 is properly attached to the vehicle body 10 by compatibly attaining these.

Accordingly, the present electric motor vehicle 1 has been devised so that the appropriate rigidity, in the vehicle width direction, of the vehicle body 10 can be obtained, considering the compatibility of the vibration noises and the weight reduction, without attaching the battery unit 40 to the floor frames 20 as firmly as possible for the purpose of the rigidity improvement.

That is, as shown in FIGS. 6 and 7, the attachment portions (lateral indirect attachment portions 90) of the battery unit 40 to the floor frames 20 which are vertically apart from each other, i.e., the connection portions of the respective bracket attachment portions 80 and the respective lateral indirect attaching brackets 75, are attached via the specified spacers 100 (an example of an intermediate part).

Specifically, the spacer 100 is made of a cylindrical metal fitting. In the present embodiment, the spacer 100 is fixedly welded to an upper face of the fastening base part 71 of the base portion 70a coaxially with the bolt hole so as to be integrated with the indirect attaching bracket 70. The height of each of the spacers 100 is set such that it matches the distance (gap).

An inner diameter of the spacer 100 is set to be greater than the bolt hole 71a. It is preferable that the thickness of the spacer 100 be small from viewpoints of the weight reduction but be large from viewpoints of the rigidity. These sizes of the spacer 100 is set based on a relationship between the suppression of the vibration noises and the weight reduction, which will be described later. Herein, the spacer 100 may be prism-shaped, not cylindrical.

The bolt B is inserted into the bolt hole 71a and the spacer 100 from a downward side of the fastening base part 71 of the lateral indirect attaching bracket 75. This bolt B is pushed into the penetration 82 and the nut 81 at the bracket attachment portion 80. Thereby, the lateral indirect attaching bracket 75 is attached to the bracket attachment portion 80.

According to this structure of the lateral indirect attachment portion 90, it is fine that the spacer 100 is just interposed, thereby achieving this at low costs and with simple modification.

Further, the lateral indirect attachment portion 90 is configured to have a rigidity ratio which is set based on a predetermined specific value relating to rigidity in order to compatibly attain the suppression of the vibration noises and the weight reduction. As described later, the present inventors have found that there is a specified relationship having an inflection point between the rigidity ratio of the lateral indirect attachment portion 90 and the vibration noises caused by the floor frame 20. Thus, the rigidity ratio of the lateral indirect attachment portion 90 is set based on this relationship so that the compatibility of the suppression of the vibration noises and the weight reduction becomes possible.

<Specific Value Relating to Rigidity, Rigidity Ratio>

In the present embodiment, inertance is used as the specific value relating to rigidity. The inertance is a known transfer function, which is a ratio (A/F) of an exciting force (F) which is inputted to acceleration (A) which is generated by this input of the exciting force. The greater the inertance is, the more easily the vibration are transmitted. Accordingly, objective comparison of the rigidity becomes possible by the inertance without measuring the rigidity value itself. Further, this inertance can provide precise measuring easily as described later.

The rigidity ratio is a ratio (Rb/Rf) of the rigidity (lower-side rigidity: Rb), in the vehicle width direction, of a section of the lateral indirect attachment portion 90 which is positioned below the lower face of the floor frame 20 to the rigidity (upper-side rigidity: Rf) of another section of the lateral indirect attachment portion 90 which is positioned above the lower face of the floor frame 20.

The upper-side rigidity corresponds to the rigidity, in the vehicle width direction, of the vehicle-body side of the lateral indirect attachment portion 90. Specifically, the upper-side rigidity is the inertance, in the vehicle width direction, of the bracket attachment portion 80 itself. Meanwhile, the lower-side rigidity corresponds to the rigidity of the battery-unit side of the lateral indirect attachment portion 90. Specifically, the lower-side rigidity is the inertance, in the vehicle width direction, of the lateral indirect attaching bracket 75 including the spacer 100.

(Measuring of Respective Rigidities of Vehicle-Body Side and Battery-Unit Side)

A measuring method of the inertance will be described specifically. Herein, the following measuring method and devices used for this measuring method are just one example, and these are changeable according to a situation.

Figure 9:
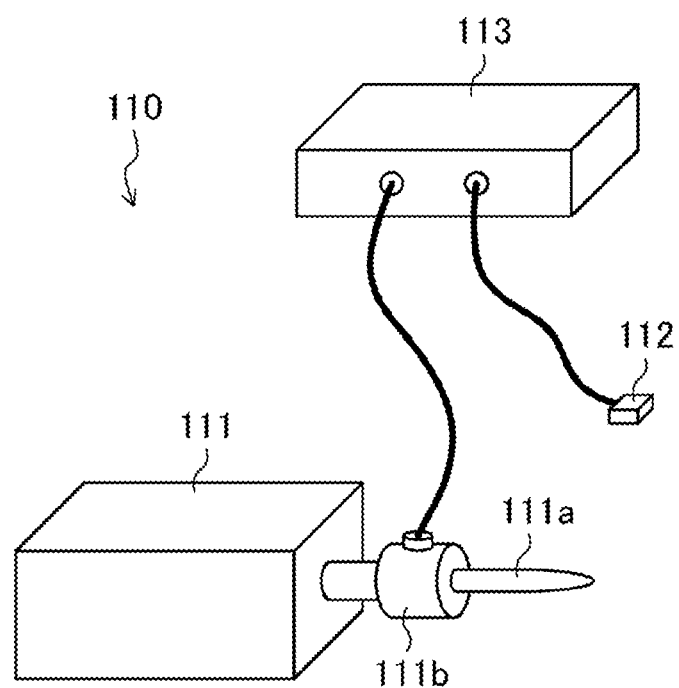
FIG. 9 is a schematic diagram of a measuring system to be used for measuring of rigidity.

A measuring system 110 which is used for the inertance measuring is schematically shown in FIG. 9. The measuring system 110 comprises an exciter 111, an acceleration sensor 112, a calculation unit 113, and others. The exciter 111 is configured such that an exciting force is applied to a measuring object from a specific direction with a certain frequency by an exciting rod 111a. To the exciting rod 111a is attached an exciting sensor 111b which measures the exciting force and the frequency and outputs measuring results to the calculation unit 113.

The acceleration sensor 112 measures the acceleration as the measuring object and outputs measuring results to the calculation unit 113. The calculation unit 113 includes hardware, such as CPU and memories, and calculation software. The calculation unit 113 calculates the inertance based on measuring results which are inputted from the exciting sensor 111b and the acceleration sensor 112.

(Measuring of Inertance of Vehicle-Body Side)

Figure 10:
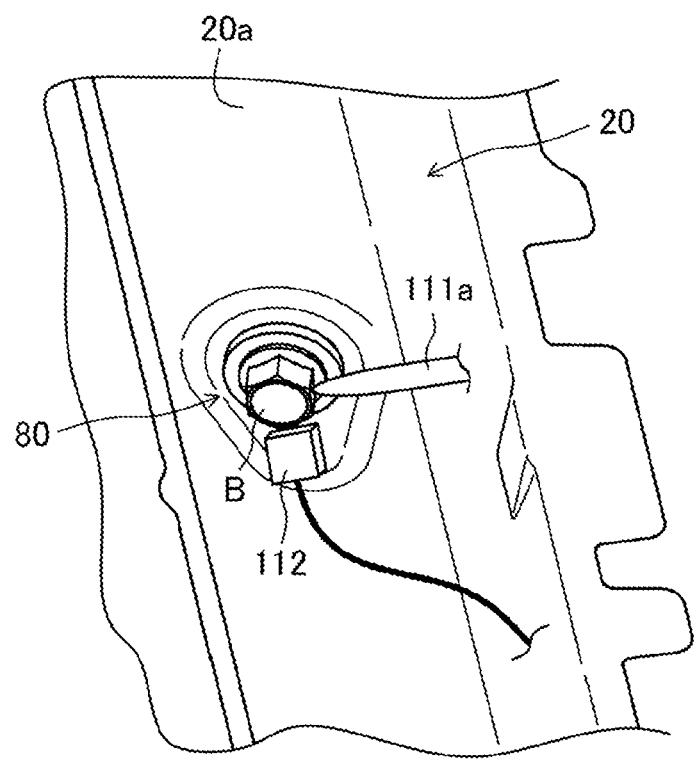
FIG. 10 is a diagram for explaining measuring of inertance of a vehicle-body side.

The vehicle body 10 in a state where the battery unit 40 is not attached is the measuring object. This vehicle body 10 is placed on plural air springs, for example. Thereby, the vehicle body 10 is supported in a state where it floats. In this state, as shown in FIG. 10, the bolt B is fastened to any one of the first-fourth bracket attachment portions 80a-80d, and the acceleration sensor 112 is adhesively fixed to its surface (the lower face of the floor frame 20). Then, a tip of the exciting rod 111a is made to contact this bolt B and the exciter 111 is set so that the exciting force can be applied, in the vehicle width direction, to the bolt B.

Then, the exiting force is applied by the exciter 111 with the random frequency of 0-800 Hz, for example. At the same time, the measuring by the exciter 111b and the acceleration sensor 112 is conducted. The calculation unit 113 calculates the inertance based on the measuring results of these sensors. Thereby, the inertance of the bracket attachment portion 80 is obtained.

In the present embodiment, the suppression of the vibration noises (road noises) of an intermediate frequency band of about 125 Hz is considered as important in particular. Accordingly, the inertances in the frequency band of 110-140 Hz are averaged and its average value is used for calculation of the rigidity ratio.

The above-described measuring process is executed for the first-fourth bracket attachment portions 80a-80d, and all inertances of the bracket attachment portions 80 having eight points, in total, are calculated. The average values of the inertances calculated at the bracket attachment portions 80 are further averaged, and its overall average value is delt as the inertance of the vehicle-body side.

(Measuring of Inertance of Battery-Unit Side)

Figure 11:
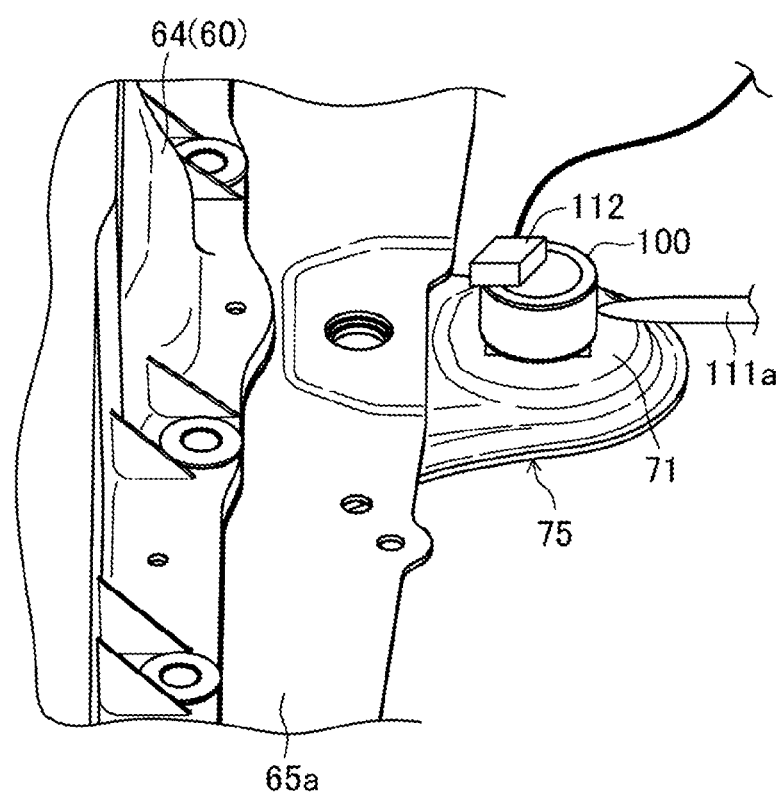
FIG. 11 is a diagram for explaining measuring of inertance of a battery-unit side.

The battery unit 40 which has not be attached yet to the vehicle body 10 is the measuring object. This battery unit 40 is supported in a state where it is made to float by the air springs or the like similarly to the measuring of the vehicle-body side. In this state, as shown in FIG. 11, the acceleration sensor 112 is adhesively fixed to a tip of the spacer 100 at any one of the first-fourth lateral indirect attaching brackets 75a-75d. Then, the tip of the exciting rod 111a is made to contact this spacer 100 and the exciter 111 is set so that the exciting force can be applied, in the vehicle width direction, to the spacer 100.

Then, the exiting force is applied by the exciter 111 similarly to the measuring of the vehicle-body side. At the same time, the measuring by the exciter 111b and the acceleration sensor 112 is conducted. The calculation unit 113 calculates the inertance based on the measuring results of these sensors. Thereby, the inertance of the lateral indirect attaching bracket 75 is obtained.

The inertances in the frequency band of 110-140 Hz are averaged and its average value is used for calculation of the rigidity ratio. This measuring process is executed for the first-fourth lateral indirect attaching brackets 75a-75d, and all inertances of the lateral indirect attaching brackets 75 having eight points, in total, are calculated. The average values of the inertances calculated at the lateral indirect attaching brackets 75 are further averaged, and its overall average value is delt as the inertance of the battery-unit side.

(Setting of Rigidity Ratio)

The overall average value of the inertance of the vehicle-body side which has been obtained as described above is the upper-side rigidity (Rf). The overall average value of the inertance of the battery-unit side is the lower-side rigidity (Rb). Thus, the rigidity ratio (Rb/Rf) is set.

Figure 12:
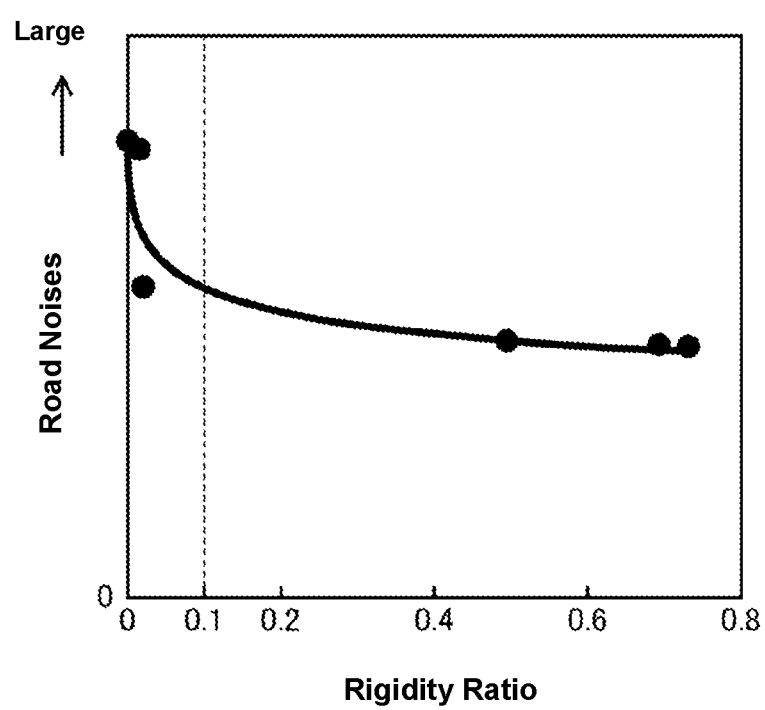
FIG. 12 is a graph showing a relationship between a rigidity ratio and vibration noises caused by the floor frame.

A graph which is based on the knowledge of the present inventors is shown in FIG. 12. This graph shows the relationship between the rigidity ratio and the vibration noises (road noises) caused by the floor frames 20. A vertical axis represents the degree of the vibration noises in the frequency band of 125 Hz. A lateral axis represents the above-described rigidity ratio.

A tendency that the smaller the rigidity ratio is, the larger the vibration noises becomes is recognized. And, an inflection point is recognized around the rigidity ratio of 0.1. Further, in a region where the rigidity ratio is smaller than 0.1, a tendency that the smaller the rigidity ratio is, the more quickly the vibration noises increase is recognized. Meanwhile, in a region where the rigidity ratio is 0.1 or greater, a tendency that the greater the rigidity ratio is, the more slowly the vibration noises decrease is recognized The greater the rigidity of the battery-unit side is, the greater the rigidity ratio is. Meanwhile, the smaller the rigidity of the battery-unit side is, the smaller the rigidity ratio is. That is, since the rigidity of the battery-unit side can be made smaller as the rigidity ratio becomes smaller, the weight of the lateral indirect attaching bracket 75 including the spacer 100 can be reduced.

Accordingly, the present electric motor vehicle 1 is configured such that the rigidity ratio is set to be 0.1 or greater. If the rigidity ratio is 0.1 or greater, the vibration noises can be effectively suppressed. In particular, if the rigidity ratio is set to be 0.1 or greater or 0.5 or smaller, the suppression of the vibration noises and the weight reduction can be compatibly attained properly.

As described above, the electric motor vehicle of the present embodiment comprises the floor panel 13 which constitutes the lower face of the vehicle, the pair of floor frames 20 which are provided to be spaced apart from each other at the both sides of the vehicle and extend in the longitudinal direction, the floor frames 20 being attached to the lower face of the floor panel 13 so as to respectively form the hollow prism-shaped closed-cross section structure together with the floor panel 13, and the battery unit 40 which are attached to the respective lower faces of the floor frames 20 at its both sides and arranged below the floor panel 13.

The battery unit 40 comprises the plural battery modules 45, the battery case 60 which store the battery modules 45 therein, and the lateral indirect attaching brackets 75 which protrude substantially horizontally from the battery case 60 and are positioned just below the lower faces (bracket attachment portions 80) of the floor frames 20 with the distance therebetween.

Further, the rigidity ratio (Rb/Rf) which is the ratio of the lower-side rigidity (Rb), in the vehicle width direction, of the section of the attachment portion (lateral indirect attachment portion 90) of the battery unit 40 to the floor frame 20 which is positioned below the lower face of the floor frame 20 to the upper-side rigidity (Rf) of the other section of the attachment portion (lateral indirect attachment portion 90) of the battery unit 40 to the floor frame 20 which is positioned above the lower face of the floor frame 20 is set, and the lateral indirect attaching brackets 75 are respectively attached to the bracket attachment portions 80 via the spacers 100 such that the above-described rigidity ratio (Rb/Rf) is 0.1 or greater.

Thus, according to the electric motor vehicle 1 of the present embodiment, even in a case where the bracket attachment portion 18 and the lateral indirect attaching bracket 75 are vertically apart from each other, these can be properly attached together by the spacer 100 with cheap-and-easy changing Further, since the lateral indirect attachment portion 90 is set at an appropriate vale based on the specific rigidity ratio, the weight increase of the vehicle 1 and the vibration noises can be effectively suppressed. Accordingly, the electric motor vehicle 1 having high performance can be provided.

Herein, the present invention is not limited to the above-described present embodiment and includes any modifications.

While the present embodiment exemplifies a case where the spacer 100 is integrated with the indirect attaching bracket 70, these members 100, 70 may be formed separately.

That is, in attaching, the spacer 100 is fixed by inserting the bolt B into the spacer 100a and this bolt B is fastened. In this case, since the height of the spacer 100 is easily changed, it has superior convenience. Further, since the common use of the indirect attaching bracket 70 is possible, reduction of the number of parts and decrease of material costs are attained.

The specific value relating to the rigidity is not limited to the inertance. Any rigidity value having the same unit is applicable because the rigidity ratio (dimensionless number) can be set.

It is necessary that the specific rigidity ratio is set at all of the lateral indirect attachment portions 90. The rigidity ratio may be set at part of the lateral indirect attachment portions 90.

The intermediate part is not limited to the case where the spacer 100 is fixed to the base portion 70a. The intermediate part may be formed at the lateral indirect attaching bracket 75 itself by expanding the base portion 70a or making the thickness of the base portion 70a large.

What is claimed is:

1. An electric motor vehicle, comprising:
a floor panel constituting a lower face of the vehicle;
a pair of floor frames provided to be spaced apart from each other at both sides of the vehicle and extending in a longitudinal direction, the pair of floor frames being attached to the lower face of the floor panel so as to respectively form a hollow prism-shaped closed-cross section structure together with the floor panel; and
a battery unit attached to respective lower faces of the pair of floor frames at both sides thereof and arranged below the floor panel,
wherein said battery unit comprises plural battery modules, a battery case storing the battery modules therein, and an attaching bracket protruding from the battery case in a vehicle width direction and positioned just below the lower face of one of said pair of floor frames with a distance therebetween,
a rigidity ratio (Rb/Rf) which is a ratio of rigidity (Rb), in the vehicle width direction, of a section of an attachment portion of said battery unit to said one of said pair of floor frames which is positioned below said lower face of the one of said pair of floor frames to rigidity (Rf) of another section of the attachment portion of said battery unit to said one of said pair of floor frames which is positioned above said lower face of the one of said pair of floor frames, is based on a predetermined specific value relating to rigidity, and
said attaching bracket is attached to said lower face of the one of said pair of floor frames via an intermediate part such that said rigidity ratio (Rb/Rf) is at least 0.1.

2. The electric motor vehicle of claim 1, wherein said rigidity ratio (Rb/Rf) is within a range of 0.1 to 0.5.

3. The electric motor vehicle of claim 2, wherein said intermediate part is a cylindrical spacer, and said attaching bracket is attached to the lower face of the one of the pair of floor frames by inserting a bolt into said spacer and fastening the bolt into a nut.

4. The electric motor vehicle of claim 3, wherein said spacer is formed integrally with said attaching bracket.

5. The electric motor vehicle of claim 3, wherein said spacer is formed separately from said attaching bracket.

6. The electric motor vehicle of claim 4, wherein inertance is said predetermined specific value relating to rigidity.

7. The electric motor vehicle of claim 6, wherein
said inertance is a ratio of acceleration generated when a specified exciting force is inputted, in the vehicle width direction, to each of said section and said other section of the attachment portion of the battery unit to the one of said pair of floor frames, to said specified exciting force,
said inertance is obtained for each of said section and said other section of the attachment portion of the battery unit to the one of said pair of floor frames, and
said rigidity ratio (Rb/Rf) is determined by considering that said inertance obtained for said section of the attachment portion of the battery unit to the one of said pair of floor frames is said rigidity (Rb) and said inertance obtained for said other section of the attachment portion of the battery unit to the one of said pair of floor frames is said rigidity (Rf).

8. The electric motor vehicle of claim 7, wherein said inertance is based on the exciting force having a frequency band of 110-140 Hz.

9. The electric motor vehicle of claim 8, wherein said battery case comprises a battery tray where said battery modules are placed and a battery frame which is configured to have a closed-cross section structure and surrounds the battery tray, and a lower face of said battery tray is located at the same level as the lower face of said battery frame.

10. The electric motor vehicle of claim 9, wherein a portion of said floor panel which vertically faces said battery unit is formed by a flat panel spaced from a tunnel portion extending in the longitudinal direction.

11. The electric motor vehicle of claim 1, wherein inertance is said predetermined specific value relating to rigidity.

12. The electric motor vehicle of claim 1, wherein said battery case comprises a battery tray where said battery modules are placed and a battery frame which is configured to have a closed-cross section structure and surrounds the battery tray, and a lower face of said battery tray is located at the same level as the lower face of said battery frame.

13. The electric motor vehicle of claim 1, wherein a portion of said floor panel which vertically faces said battery unit is formed by a flat panel spaced from a tunnel portion extending in the longitudinal direction.

14. The electric motor vehicle of claim 11, wherein
said inertance is a ratio of acceleration generated when a specified exciting force is inputted, in the vehicle width direction, to each of said section and said other section of the attachment portion of the battery unit to the one of said pair of floor frames, to said specified exciting force,
said inertance is obtained for each of said section and said other section of the attachment portion of the battery unit to the one of said pair of floor frames, and
said rigidity ratio (Rb/Rf) is determined by considering that said inertance obtained for said section of the attachment portion of the battery unit to the one of said pair of floor frames is said rigidity (Rb) and said inertance obtained for said other section of the attachment portion of the battery unit to the one of said pair of floor frames is said rigidity (Rf).

15. The electric motor vehicle of claim 11, wherein said battery case comprises a battery tray where said battery modules are placed and a battery frame which is configured to have a closed-cross section structure and surrounds the battery tray, and a lower face of said battery tray is located at the same level as the lower face of said battery frame.

16. The electric motor vehicle of claim 11, wherein a portion of said floor panel which vertically faces said battery unit is formed by a flat panel spaced from a tunnel portion extending in the longitudinal direction.

17. The electric motor vehicle of claim 12, wherein a portion of said floor panel which vertically faces said battery unit is formed by a flat panel spaced from a tunnel portion extending in the longitudinal direction.

18. The electric motor vehicle of claim 1, wherein a connection portion of a bracket attachment portion which is provided at a specified point of said lower face of the one of said pair of floor frames and said attaching bracket are attached via a spacer which is said intermediate part, whereby said rigidity ratio is at least 0.1.

19. An electric motor vehicle, comprising:
a floor panel constituting a lower face of the vehicle;
a pair of floor frames provided to be spaced apart from each other at both sides of the vehicle and extending in a longitudinal direction, the pair of floor frames being attached to the lower face of the floor panel so as to respectively form a hollow prism-shaped closed-cross section structure together with the floor panel; and
a battery unit attached to respective lower faces of the pair of floor frames at both sides thereof and arranged below the floor panel, wherein said battery unit comprises plural battery modules, a battery case storing the battery modules therein, and an attaching bracket protruding from the battery case in a vehicle width direction and positioned just below the lower face of one of said pair of floor frames with a distance therebetween, a bracket attachment portion where said attaching bracket is attached is provided at the lower face of said one of said pair of floor frames, said battery unit is attached to said one of said pair of floor frames by connection of said bracket attachment portion and said attaching bracket, and said attaching bracket is attached to said lower face of the one of said pair of floor frames via a spacer such that a rigidity ratio (Rb/Rf) which is a ratio of rigidity (Rb), in a vehicle width direction, of said bracket attachment portion itself to rigidity (Rf), in a vehicle width direction, of said attaching bracket including said spacer is at least 0.1.

* * * * *